US 9,951,962 B2

(12) United States Patent
Tamaki et al.

(10) Patent No.: US 9,951,962 B2
(45) Date of Patent: Apr. 24, 2018

(54) HEAT PUMP HEATING AND HOT-WATER SYSTEM

(75) Inventors: Shogo Tamaki, Tokyo (JP); Makoto Saito, Tokyo (JP); Fumitake Unezaki, Tokyo (JP); Nobuaki Uehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 880 days.

(21) Appl. No.: 14/361,331

(22) PCT Filed: Dec. 6, 2011

(86) PCT No.: PCT/JP2011/078199
§ 371 (c)(1),
(2), (4) Date: May 29, 2014

(87) PCT Pub. No.: WO2013/084301
PCT Pub. Date: Jun. 13, 2013

(65) Prior Publication Data
US 2014/0291411 A1 Oct. 2, 2014

(51) Int. Cl.
*F24D 19/10* (2006.01)
*F24D 11/02* (2006.01)
(Continued)

(52) U.S. Cl.
CPC ............ *F24D 19/1072* (2013.01); *F24D 3/18* (2013.01); *F24D 11/0214* (2013.01);
(Continued)

(58) Field of Classification Search
CPC .................................................. F24D 19/1072
See application file for complete search history.

(56) References Cited

U.S. PATENT DOCUMENTS 4,255,936 A * 3/1981 Cochran ................. F04D 13/06
165/45
4,507,938 A * 4/1985 Hama ................. F24D 11/0214
165/58
(Continued)

FOREIGN PATENT DOCUMENTS

EP 1 775 526 A1 4/2007
EP 1 780 476 A1 5/2007
(Continued)

OTHER PUBLICATIONS

International Preliminary Report on Patentability dated Jun. 10, 2014 for the corresponding international application No. PCT/JP2011/078199 (English translation only).
(Continued)

*Primary Examiner* — Alissa Tompkins
*Assistant Examiner* — Phillip E Decker
(74) *Attorney, Agent, or Firm* — Posz Law Group, PLC

(57) ABSTRACT

A heat pump heating and hot-water system includes a water heating heat exchanger for heating water by heat exchange with a heating medium heated by a heat pump unit, an indoor heating unit, a heating circulation circuit for selectively pumping the heating medium to either of the water heating heat exchanger and the indoor heating unit using a heating medium pump, and a hot-water accumulating circuit that sends water in a hot-water storage tank to the water heating heat exchanger and returns water having passed through the water heating heat exchanger to the hot-water storage tank using a water pump. The volumetric flow rate of the heating medium pumped to the water heating heat exchanger by the heating medium pump is higher than or equal to the volumetric flow rate of the water pumped to the water heating heat exchanger by the water pump.

21 Claims, 8 Drawing Sheets

(51) Int. Cl.
*F24D 3/18* (2006.01)
*F24D 17/00* (2006.01)
*F24D 17/02* (2006.01)

(52) U.S. Cl.
CPC ........... *F24D 17/001* (2013.01); *F24D 17/02* (2013.01); *F24D 19/1039* (2013.01); *F24D 19/1054* (2013.01); *F25B 2600/13* (2013.01); *Y02B 30/52* (2013.01); *Y02B 30/745* (2013.01)

(56) References Cited

U.S. PATENT DOCUMENTS

| | | | | |
|---|---|---|---|---|
| 5,081,846 | A * | 1/1992 | Dudley | F24D 19/1072 62/115 |
| 6,370,896 | B1 * | 4/2002 | Sakakibara | F25B 9/008 62/201 |
| 6,405,551 | B1 * | 6/2002 | Kuwabara | F24D 17/02 62/238.6 |
| 8,365,546 | B2 * | 2/2013 | Hayashida | H01M 10/486 236/1 C |
| 9,651,267 | B2 * | 5/2017 | Tamaki | F24D 19/1051 |
| 2002/0014085 | A1 | 2/2002 | Sakakibara et al. | |
| 2007/0199337 | A1 * | 8/2007 | Otake | F24D 17/02 62/183 |
| 2007/0246555 | A1 * | 10/2007 | Nishimura | F24D 3/08 237/2 B |
| 2009/0211282 | A1 * | 8/2009 | Nishimura | F24D 17/02 62/238.6 |
| 2010/0025488 | A1 * | 2/2010 | Park | F24D 3/08 237/2 B |
| 2010/0051713 | A1 * | 3/2010 | Back | F24D 11/0214 237/2 B |
| 2010/0319378 | A1 * | 12/2010 | Chikami | F24D 3/082 62/238.7 |
| 2011/0120179 | A1 * | 5/2011 | Chin | F24D 3/08 62/510 |
| 2011/0154840 | A1 * | 6/2011 | Mihara | F25B 9/008 62/196.1 |
| 2011/0283726 | A1 * | 11/2011 | Sim | F24D 19/1072 62/160 |
| 2011/0289950 | A1 * | 12/2011 | Kim | F24D 11/0214 62/160 |
| 2016/0265794 | A1 * | 9/2016 | Luo | F24D 19/1072 |

FOREIGN PATENT DOCUMENTS

| | | | |
|---|---|---|---|
| JP | 10-232093 | A | 9/1998 |
| JP | 3227651 | B2 | 9/2001 |
| JP | 2004309083 | A * | 11/2004 |
| JP | 2006010232 | A * | 1/2006 |
| JP | 2006-029668 | A | 2/2006 |
| JP | 2007-263523 | A | 10/2007 |
| JP | 2008-082664 | A | 4/2008 |
| JP | 2009-097770 | A | 5/2009 |
| JP | 2010-038445 | A | 2/2010 |
| JP | 2010-065852 | A | 3/2010 |
| JP | 2010-201325 | A | 9/2010 |
| JP | 2011-027299 | A | 2/2011 |

OTHER PUBLICATIONS

International Search Report of the International Searching Authority dated Feb. 21, 2012 for the corresponding international application No. PCT/JP2011/078199 (with English translation).

Chinese Office Action dated Jun. 23, 2015 in the corresponding CN application No. 201180075322.7(English translation attached).

Extended European Search Report dated Jun. 18, 2015 issued in corresponding EP patent application No. 11877045.2.

* cited by examiner

INDOOR HEATING OPERATION MODE

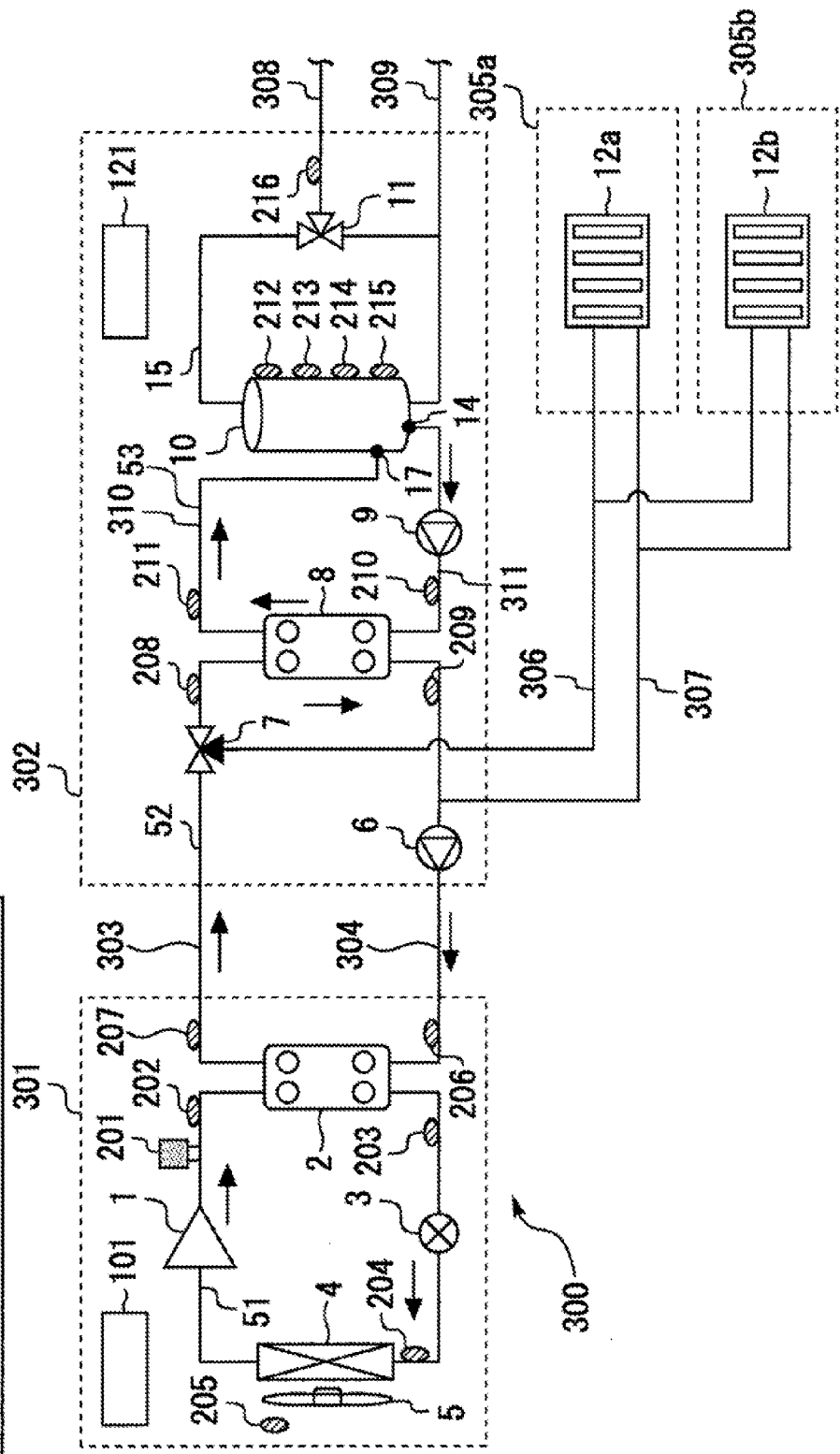

HEAT PUMP HEATING AND HOT-WATER SYSTEM

CROSS REFERENCE TO RELATED APPLICATIONS

This application is a U.S. national stage application of International Application No. PCT/JP2011/078199 filed on Dec. 6, 2011, the disclosure of which is incorporated herein by reference.

TECHNICAL FIELD

The present invention relates to a heat pump heating and hot-water system for heating and hot-water supply using a heat pump.

BACKGROUND ART

Patent Literature 1 discloses a heat pump heating and hot-water system including a hot-water storage tank for storing hot water heated by a heat pump unit, a radiator for indoor heating by use of hot water heated by the heat pump unit, and a hot-water-supply heat exchanger consisting of a coil-form pipe provided in the hot-water storage tank. In this system, when hot water is supplied, feed-water is heated by the hot-water-supply heat exchanger in the hot-water storage tank to produce hot-water.

CITATION LIST

Patent Literature

Patent Literature 1: Japanese Patent Laid-Open No. 2010-38445

SUMMARY OF INVENTION

Technical Problem

In the above-described conventional system, hot water stored in the hot-water storage tank is not supplied directly, but hot water heated by the hot-water-supply heat exchanger in the hot-water storage tank is supplied. This makes it difficult to utilize the heat accumulated in the hot-water storage tank without waste. In addition, high-temperature hot water must be stored in the hot-water storage tank. In addition, the hot-water-supply heat exchanger consisting of a coil-form pipe has poor heat transfer performance. For these reasons, the above-described conventional system is poor in hot-water supply efficiency. In addition, this system has a problem that, since the hot-water-supply heat exchanger is installed in the hot-water storage tank, when a trouble or failure occurs, the replacement work is troublesome, so that the maintainability is poor.

The present invention has been made to solve the above-described problems, and accordingly an object thereof is to provide a heat pump heating and hot-water system capable of carrying out hot-water accumulating operation with high operation efficiency.

Solution to Problem

A heat pump heating and hot-water system of the invention is a system which comprises a heat pump for heating a heating medium, one or a plurality of heating medium pumps for pumping the heating medium, a water heating heat exchanger for heating water by heat exchange between the heating medium and the water, an indoor heating heat exchanger for warming a room by the heating medium, flow path switching means for switching a destination of the heating medium between the water heating heat exchanger and the indoor heating heat exchanger, a heating medium piping for connecting the heating medium pump(s), the water heating heat exchanger, the indoor heating heat exchanger, and the flow path switching means, a hot-water storage tank, one or a plurality of water pumps for pumping the water, a water piping for connecting the hot-water storage tank, the water pump(s), and the water heating heat exchanger, the water piping allowing the water taken out of the hot-water storage tank to go through the water heating heat exchanger and to return to the hot-water storage tank a heat pump controller for controlling the heat pump, and a pump controller for controlling the heating medium pump(s) and the water pump(s), a volumetric flow rate of the heating medium pumped to the water heating heat exchanger by the heating medium pump(s) being higher than or equal to a volumetric flow rate of the water pumped to the water heating heat exchanger by the water pump(s).

A heat pump heating and hot-water system of the invention is a system which comprises a heat pump for heating a heating medium, one or a plurality of heating medium pumps for pumping the heating medium, a water heating heat exchanger for heating water by heat exchange between the heating medium and the water, an indoor heating heat exchanger for warming a room by the heating medium, flow path switching means for switching a destination of the heating medium between the water heating heat exchanger and the indoor heating heat exchanger, a heating medium piping for connecting the heating medium pump(s), the water heating heat exchanger, the indoor heating heat exchanger, and the flow path switching means, a hot-water storage tank, one or a plurality of water pumps for pumping the water, a water piping for connecting the hot-water storage tank, the water pump(s), and the water heating heat exchanger, the water piping allowing the water taken out of the hot-water storage tank to go through the water heating heat exchanger and to return to the hot-water storage tank, a heat pump controller for controlling the heat pump, and a pump controller for controlling the heating medium pump(s) and the water pump(s), wherein the pump controller operates the heating medium pump(s) and the water pump(s), while the water is heated by the heat exchange between the heating medium and the water in the water heating heat exchanger, so that a difference between a temperature of the heating medium flowing into the water heating heat exchanger and a temperature of the heating medium flowing out of the water heating heat exchanger is smaller than or equal to a difference between a temperature of the water flowing out of the water heating heat exchanger and a temperature of the water flowing into the water heating heat exchanger.

Advantageous Effect of Invention

According to the heat pump heating and hot-water system in accordance with the present invention, hot-water accumulating operation can be carried out with high operation efficiency.

BRIEF DESCRIPTION OF DRAWINGS

FIG. 11 is a system circuit diagram of a heat pump heating and hot-water system in accordance with a third embodiment of the present invention indicating flow directions of refrigerant, heating medium, and water during a hot-water accumulating operation mode.

DESCRIPTION OF EMBODIMENTS

Figure 1:
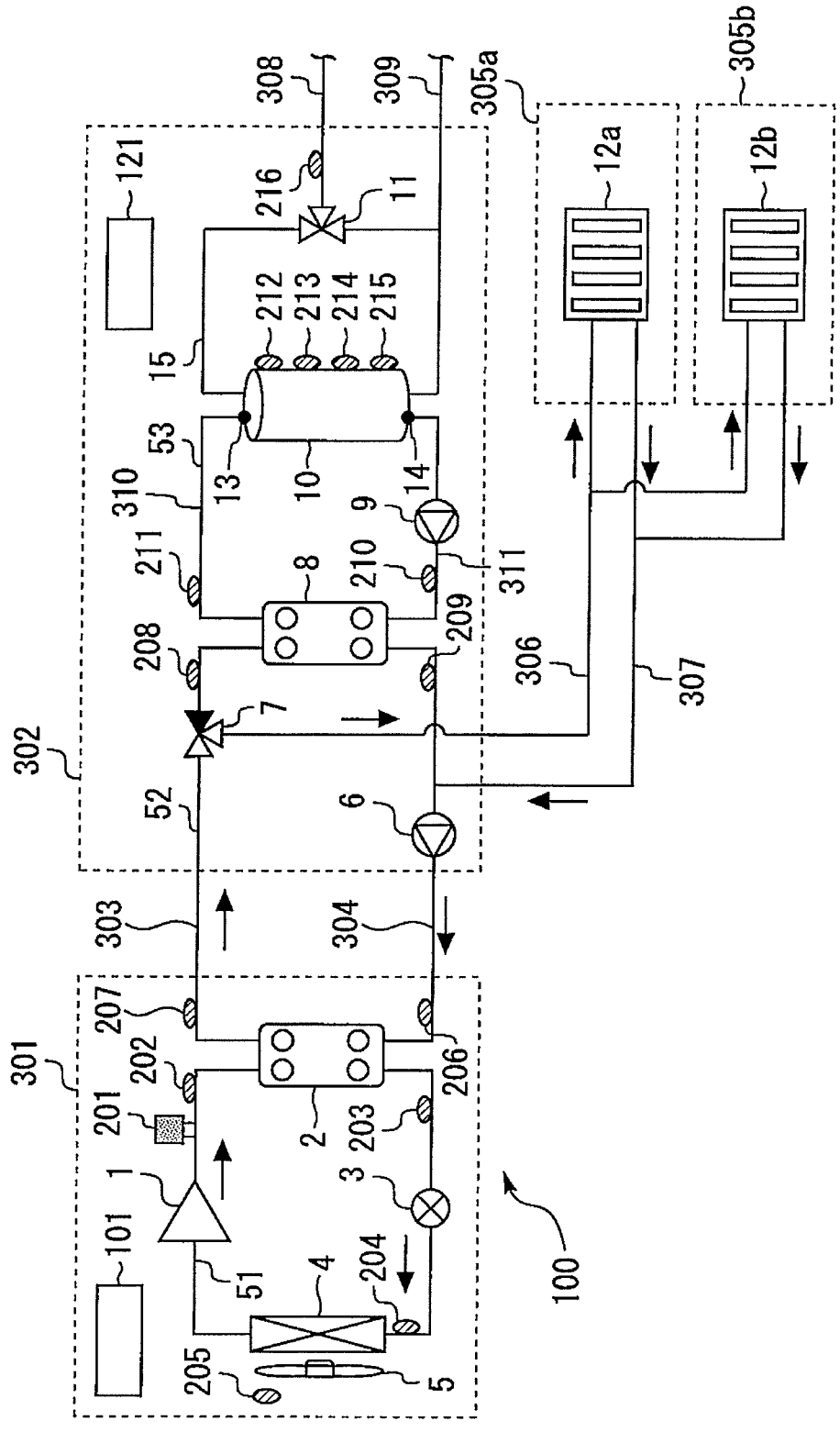
FIG. 1 is a system circuit diagram of a heat pump heating and hot-water system in accordance with a first embodiment of the present invention indicating flow directions of refrigerant and heating medium during an indoor heating operation mode.

Embodiments of the present invention will now be described with reference to the accompanying drawings. In the drawings, the same reference signs are applied to the same or equivalent parts, and the duplicated explanation thereof is omitted.

First Embodiment

<Equipment Configuration>

FIG. 1 is a system circuit diagram of a heat pump heating and hot-water system 100 in accordance with a first embodiment of the present invention. As shown in FIG. 1, the heat pump heating and hot-water system 100 includes a heat pump unit 301 mounted with a refrigerant circuit 51 of vapor compression type refrigerating cycle (heat pump cycle) and a part of a heating circulation circuit 52, a hot-water storage tank unit 302 mounted with a part of the heating circulation circuit 52 and a hot-water accumulating circuit 53, indoor heating units 305a and 305b each of which is configured by a part of the heating circulation circuit 52 and heats a room. The heat pump unit 301 and the hot-water storage tank unit 302 are connected to each other via a heating medium pipe 303 and a heating medium pipe 304. The hot-water storage tank unit 302 and the indoor heating units 305a and 305b are connected to each other via a heating medium pipe 306 and a heating medium pipe 307. The hot-water storage tank unit 302 is connected to a hot-water supply pipe 308 connected to a hot-water supply terminal (for example, a faucet of a kitchen, a lavatory, and the like), and is connected to a feed-water pipe 309 for feeding water from a water supply source such as waterworks.

The refrigerant used in the refrigerant circuit 51 of the heat pump unit 301 is not subject to any special restriction, and, for example, a natural refrigerant such as R410A, R32, HFO-1234yf, hydrocarbon, and carbon dioxide, can be used. The heating medium used in the heating circulation circuit 52 is not subject to any special restriction, and, for example, a liquid such as water, ethylene glycol, propylene glycol, Naiburain (trade name), and a mixture of these liquids, can be used. In addition, for ethylene glycol, propylene glycol, and Naiburain, each of these liquids having any concentration can be used.

This heat pump heating and hot-water system 100 is installed for conventional houses, office buildings, and the like. The heat pump heating and hot-water system 100 can respond hot-water supply instructions (hot-water supply ON/OFF) or indoor heating instructions (indoor heating ON/OFF) selected by the hot-water storage tank unit 302.

<Heat Pump Unit 301>

The heat pump unit 301 is mounted with the refrigerant circuit 51 in which a compressor 1, a condenser 2, an expansion valve 3, and an evaporator 4 are connected in a loop form by a refrigerant piping. The compressor 1 sucks and compresses the refrigerant to make the refrigerant in a high-temperature and high-pressure state. The compressor 1 is preferably of a type in which the rotating speed is controlled, for example, by inverter control. The condenser 2 heats the heating medium and cools the refrigerant by means of the heat exchange between the heating medium and the refrigerant. The condenser 2 may be a plate type heat exchanger. The expansion valve 3 reduces the pressure of the refrigerant to make the refrigerant in a low-temperature and low-pressure state. The degree of opening of the expansion valve 3 is variable. The evaporator 4 absorbs heat from the outside air and heats the refrigerant by means of the heat exchange between the outside air and the refrigerant. The evaporator 4 is configured, for example, by a cross fin type fin-and-tube air heat exchanger formed by a heat transfer tube and many fins. For the evaporator 4, a blower 5 is provided. Using the blower 5, the outside air is sucked, and heat exchange is carried out by the evaporator 4, and thereafter the air is discharged to the outside. The blower 5 includes a fan such as a propeller fan, and a motor, for example, consisting of a DC fan motor that drives this fan. The blower 5 is configured so that the flow rate of the supplied air is variable.

The heat pump unit 301 is further provided with a pressure sensor 201 for detecting the pressure of the refrigerant discharged from the compressor 1, a temperature sensor 202 for detecting the temperature of the refrigerant discharged from the compressor 1, a temperature sensor 203 for detecting the temperature of the refrigerant flowing out of the condenser 2, a temperature sensor 204 for detecting the temperature of the refrigerant flowing into the evaporator 4, a temperature sensor 205 for detecting the outside air temperature (the temperature of the air flowing into the evaporator 4), a temperature sensor 206 for detecting the temperature of the heating medium flowing into the condenser 2, and a temperature sensor 207 for detecting the temperature of the heating medium flowing out of the condenser 2.

<Hot-Water Storage Tank Unit 302>

The hot-water storage tank unit 302 is mounted with a heating medium pump 6, a three-way valve 7, a water heating heat exchanger 8, a water pump 9, a hot-water storage tank 10, a mixing valve 11, and the like. The heating medium pump 6 has a function of circulating the heating medium in the heating circulation circuit 52. The heating medium pump 6 may be of a variable speed type (for example, through inverter control) or may be of a fixed speed type. The three-way valve 7 functions as a flow path switching means that switches over the flow direction of heating medium. At the time of hot-water accumulating operation, the three-way valve 7 is changed over so that the heating medium flows to the water heating heat exchanger 8. At the time of indoor heating operation, the three-way valve 7 is changed over so that the heating medium flows to the indoor heating units 305a and 305b. The water heating heat exchanger 8 heats the water and cools the heating medium by heat exchange between the heating medium and the water. The water heating heat exchanger 8 is configured, for example, by a plate type heat exchanger. In this embodiment, the configuration is made such that, in the water heating heat exchanger 8, the heating medium and the water flow in the reverse direction. The water pump 9 has a function of circulating the water in the hot-water accumulating circuit 53. The water pump 9 may be of a variable speed type (for example, through inverter control) or may be of a fixed speed type. The hot-water storage tank 10 has a function of storing the heated hot water and the water before being heated. The hot-water storage tank 10 is of a flooded type in which hot water is stored while temperature stratification is formed, so that high-temperature water is stored in the upper part, and low-temperature water is stored in the lower part. To a connection point 13 above the hot-water storage tank 10, a water pipe 310 of the hot-water accumulating circuit 53 is connected, and to a connection point 14 below the hot-water storage tank 10, a water pipe 311 of the hot-water accumulating circuit 53 is connected. By driving the water pump 9, the water in the hot-water storage tank 10 is caused to flow out through the connection point 14, being pumped to the water heating heat exchanger 8 through the water pipe 311 and being heated, and thereafter is caused to flow in the water pipe 310, being returned to the hot-water storage tank 10, and is caused to flow into the hot-water storage tank 10 through the connection point 13.

A hot-water delivery pipe 15 connects the upper part of the hot-water storage tank 10 to the mixing valve 11. The feed-water pipe 309 is connected to both the lower part of the hot-water storage tank 10 and the mixing valve 11. The hot-water supply pipe 308 is further connected to the mixing valve 11. In compliance with the user's request of hot-water supply, hot water flows out of the upper part of the hot-water storage tank 10 to the hot-water delivery pipe 15, and is supplied to the mixing valve 11. At this time, low-temperature water of the same amount as the amount of the hot water flowing out to the hot-water delivery pipe 15 flows into the lower part of the hot-water storage tank 10 through the feed-water pipe 309. The mixing valve 11 mixes the hot water flowing through the hot-water delivery pipe 15 with the low-temperature water flowing through the feed-water pipe 309, and the mixed water is sent to the hot-water supply pipe 308. The mixing valve 11 is configured so as to be capable of controlling the mixing ratio between the hot water and the low-temperature water, so that hot water having a preset temperature is produced.

The hot-water storage tank unit 302 is further provided with a temperature sensor 208 for detecting the temperature of the heating medium flowing into the water heating heat exchanger 8, a temperature sensor 209 for detecting the temperature of the heating medium flowing out of the water heating heat exchanger 8, a temperature sensor 210 for detecting the temperature of the water flowing into the water heating heat exchanger 8, a temperature sensor 211 for detecting the temperature of the water flowing out of the water heating heat exchanger 8, temperature sensors 212, 213, 214 and 215 for detecting the water temperatures in the hot-water storage tank 10, and a temperature sensor 216 for detecting the water temperature in the hot-water supply pipe 308.

<Indoor Heating Units 305a and 305b>

The indoor heating units 305a and 305b include, respectively, radiators 12a and 12b (panel heaters) each serving as an indoor heating heat exchanger. By causing the heating medium to flow in the radiators 12a and 12b, the air in the room is heated by radiation.

In this embodiment, two indoor heating units are provided; however, one or three or more indoor heating units may be provided. In this embodiment, the radiator is used as the indoor heating heat exchanger; however, any other type of indoor heating heat exchanger such as a fan coil unit and a floor heating heater may be used as the indoor heating heat exchanger, or a plurality of types of indoor heating heat exchangers may be mixedly used.

<Heat Pump Controller 101 and Pump Controller 121>

Figure 2:
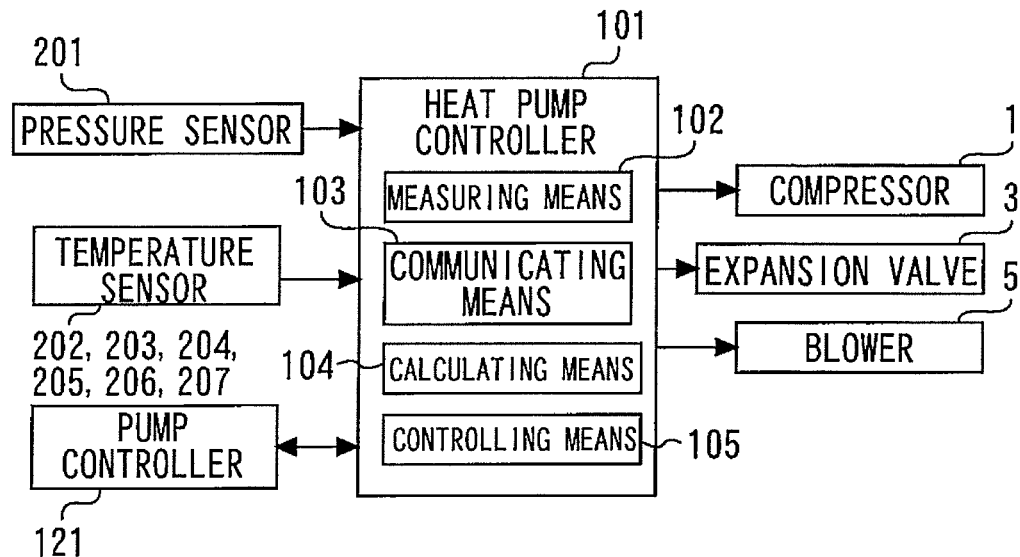
FIG. 2 is a block diagram showing a configuration of a heat pump controller of the heat pump heating and hot-water system in accordance with the first embodiment of the present invention.

The heat pump unit 301 is provided with a heat pump controller 101 configured, for example, by a microcomputer. The hot-water storage tank unit 302 is provided with a pump controller 121 configured, for example, by a microcomputer. FIG. 2 is a block diagram showing the configuration of the heat pump controller 101. The heat pump controller 101 has a measuring means 102 for obtaining information on pressure and temperature based on the outputs of the pressure sensor 201, the temperature sensors 202, 203, 204, 205, 206 and 207, and the like, a communicating means 103 for transmitting the operational conditions (temperatures, pressures, etc.), the abnormality signals, and the like of the heat pump unit 301 to the pump controller 121, and inversely for receiving the operational conditions (temperatures, behavior of devices, etc.), the abnormality signals, and the like of the hot-water storage tank unit 302 from the pump controller 121, a calculating means 104 for calculating the condensation temperature, the degree of supercooling, and the like based on the measurement information obtained by the measuring means 102, and a controlling means 105 for controlling the operational conditions (operation method of the compressor 1, the degree of opening of the expansion valve 3, etc.) of the heat pump unit 301 based on the measurement information, the calculation results of the calculating means 104, and the like. The communicating means 103 is configured to communicate mutually with the later-described communicating means 125 using, for example, a telephone line, a LAN line, or wireless communication.

Figure 3:
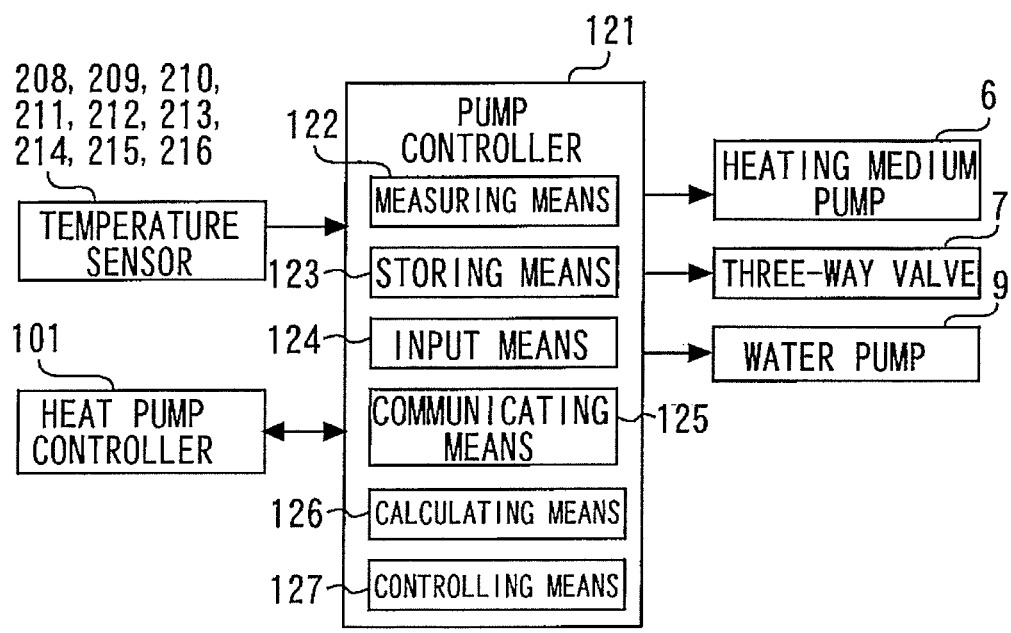
FIG. 3 is a block diagram showing a configuration of a pump controller of the heat pump heating and hot-water system in accordance with the first embodiment of the present invention.

FIG. 3 is a block diagram showing the configuration of the pump controller 121. The pump controller 121 has a measuring means 122 for obtaining information on temperature based on the outputs of the temperature sensors 208, 209, 210, 211, 212, 213, 214, 215 and 216, a storing means 123 for storing the kind of heating medium flowing in the heating circulation circuit 52, and the like, an input means 124 for recognizing inputs such as the ON/OFF instructions of operation mode given by the user and the information inputted from the installer, the communicating means 125 for transmitting the operational conditions (temperatures, behavior of devices, etc.), the abnormality signals, and the like of the hot-water storage tank unit 302 to the heat pump controller 101, and inversely for receiving the operational conditions (temperatures, pressures, etc.), the abnormality signals, and the like of the heat pump unit 301 from the heat pump controller 101, a calculating means 126 for calculating the temperature difference of water flowing into and out of the water heating heat exchanger 8 and the temperature difference of heating medium flowing into and out of the water heating heat exchanger 8 based on the measurement information obtained by the measuring means 122, and a controlling means 127 for controlling the operational conditions (the operational conditions of the heating medium pump 6 and the water pump 9 and the change-over of the three-way valve 7, etc.) based on the measurement information, the calculation results of the calculating means 126, and the like.

In the first embodiment, the configuration is such that the heat pump controller 101 is provided in the heat pump unit 301, and the pump controller 121 is provided in the hot-water storage tank unit 302; however, the configuration is not limited to this one, and the configuration may be such that the heat pump controller 101 is provided in the hot-water storage tank unit 302, or the pump controller 121 is provided in the heat pump unit 301. Alternatively, the heat pump controller 101 and the pump controller 121 may be integrated. Or the configuration may be such that a controller (not shown) is prepared at a place other than the heat pump unit 301 and the hot-water storage tank unit 302, and this controller bears some or all functions of the heat pump controller 101 and the pump controller 121.

<Operation Mode>

The heat pump heating and hot-water system 100 controls each device mounted in the heat pump unit 301, the hot-water storage tank unit 302, and the indoor heating units 305a and 305b, and executes the indoor heating operation mode or the hot-water accumulating operation mode in compliance with the indoor heating load requested for the indoor heating units 305a and 305b and the hot-water supply demand requested for the hot-water storage tank unit 302. The information of ON/OFF of the indoor heating operation mode or the hot-water accumulating operation mode is inputted to the input means 124 of the pump controller 121 by the user or automatically based on the time or the like. This inputted information is transmitted to the heat pump controller 101 by the communicating means 125. In the following, the operating action in each operation mode is explained.

[Indoor Heating Operation Mode]

First, the indoor heating operation mode is explained with reference to FIG. 1. The arrow marks in FIG. 1 indicate the flow directions of the refrigerant and the heating medium. In the indoor heating operation mode, the three-way valve 7 is changed over in such a manner that the outlet of the condenser 2 is connected to the indoor heating units 305a and 305b. In this state, the operations of the heat pump unit 301 and the hot-water storage tank unit 302 are carried out. Then, in the refrigerant circuit 51, the high-temperature and high-pressure gas refrigerant discharged from the compressor 1 flows into the condenser 2, where the gas refrigerant is cooled by the heating medium, and turns to a high-pressure liquid refrigerant. Thereafter, the refrigerant flows out of the condenser 2, being decompressed at the expansion valve 3, and turns to a low-pressure two-phase refrigerant. Subsequently, the refrigerant flows into the evaporator 4, absorbing heat from the outside air, and turns to a low-pressure gas refrigerant. Then, the refrigerant is again sucked into the compressor 1. For the compressor 1, the expansion valve 3, and the blower 5, the operation conditions thereof are controlled by the controlling means 105 of the heat pump controller 101 depending on the temperature and pressure measured by the measuring means 102.

In the heating circulation circuit 52, the heating medium pumped by the heating medium pump 6 flows out of the hot-water storage tank unit 302, and flows into the heat pump unit 301 through the heating medium pipe 304. After having flowed into the heat pump unit 301, the heating medium is heated by the refrigerant in the condenser 2 to a high temperature. This high-temperature heating medium flows out of the heat pump unit 301, and flows again into the hot-water storage tank unit 302 through the heating medium pipe 303. Thereafter, the heating medium flows out of the hot-water storage tank unit 302 through the three-way valve 7, and flows into the indoor heating units 305a and 305b through the heating medium pipe 306. The heating medium and the air in the room are heat-exchanged in the radiators 12a and 12b, whereby the room is warmed, and the temperature of heating medium becomes low. The heating medium whose temperature has become low flows out of the indoor heating units 305a and 305b, and flows into the hot-water storage tank unit 302 through the heating medium pipe 307, flowing again into the heating medium pump 6. For the heating medium pump 6, the operation conditions thereof are controlled by the controlling means 127 of the pump controller 121 depending on the measured temperature and pressure. During the indoor heating operation mode, the water pump 9 stands idle and the water in the hot-water accumulating circuit 53 does not flow, so the water in the hot-water storage tank 10 is not heated.

[Hot-Water Accumulating Operation Mode]

Figure 4:
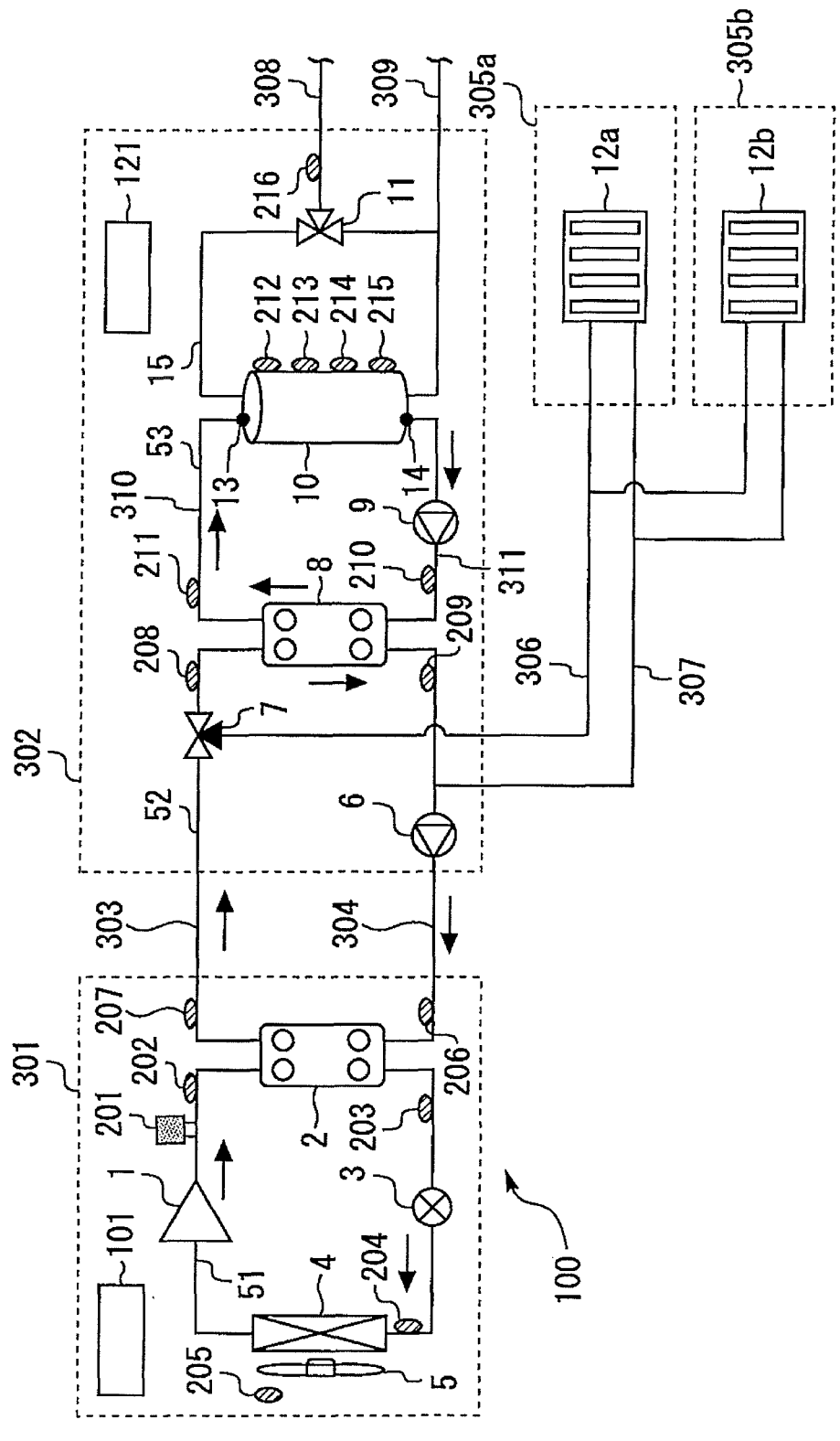
FIG. 4 is a system circuit diagram of the heat pump heating and hot-water system in accordance with the first embodiment of the present invention indicating flow directions of refrigerant, heating medium, and water during a hot-water accumulating operation mode.

Next, the hot-water accumulating operation mode is explained with reference to FIG. 4. The arrow marks in FIG. 4 indicate the flow directions of the refrigerant, heating medium, and water. In the hot-water accumulating operation mode, the three-way valve 7 is changed over in such a manner that the outlet of the condenser 2 and the inlet of the water heating heat exchanger 8 are connected to each other. In this state, the operations of the heat pump unit 301 and the hot-water storage tank unit 302 are carried out. Then, in the refrigerant circuit 51, the high-temperature and high-pressure gas refrigerant discharged from the compressor 1 flows into the condenser 2, where the gas refrigerant is cooled by the heating medium, and turns to a high-pressure liquid refrigerant. Thereafter, the refrigerant flows out of the condenser 2, being decompressed at the expansion valve 3, and turns to a low-pressure two-phase refrigerant. Subsequently, the refrigerant flows into the evaporator 4, absorbing heat from the outside air, and turns to a low-pressure gas refrigerant. Then, the refrigerant is again sucked into the compressor 1. For the compressor 1, the expansion valve 3, and the blower 5, the operation conditions thereof are controlled by the controlling means 105 of the heat pump controller 101 depending on the temperature and pressure measured by the measuring means 102.

In the heating circulation circuit 52, the heating medium pumped by the heating medium pump 6 flows out of the hot-water storage tank unit 302, and flows into the heat pump unit 301 through the heating medium pipe 304. After having flowed into the heat pump unit 301, the heating medium is heated by the refrigerant in the condenser 2 to a high temperature. This high-temperature heating medium flows out of the heat pump unit 301, and flows again into the hot-water storage tank unit 302 through the heating medium pipe 303. Thereafter, the heating medium flows into the water heating heat exchanger 8 through the three-way valve 7, and in the water heating heat exchanger 8, the heating medium heats the water by means of the heat exchange with the water, and the temperature of the heating medium becomes low. Thereafter, the heating medium whose temperature has become low flows again into the heating medium pump 6.

In the hot-water accumulating circuit 53, the water flowing out through the connection point 14 of the hot-water storage tank 10 is caused to flow to the water heating heat exchanger 8 through the water pipe 311. This water is heated by the heating medium in the water heating heat exchanger 8, turning to hot water. The hot water flowing out of the water heating heat exchanger 8 flows into the hot-water storage tank 10 through the connection point 13 after having passed through the water pipe 310, and is stored in the hot-water storage tank 10. The water flows out continuously through the connection point 14 of the hot-water storage tank 10, and the hot water flows continuously into the hot-water storage tank 10 through the connection point 13, whereby the amount of hot water in the hot-water storage tank 10 increases. During the hot-water accumulating operation mode, the indoor heating is not performed, and the heating medium does not flow in the indoor heating units 305a and 305b.

<Method for Hot-Water Accumulating Operation Achieving High Efficiency>

In this embodiment, the connection point 13 lies above the hot-water storage tank 10. Since the density of water decreases when the temperature thereof becomes high, higher-temperature hot water rises and stays in the upper portion of the hot-water storage tank 10. The hot water that has heated by the water heating heat exchanger 8 and returned to the hot-water storage tank 10 stays in the upper portion of the hot-water storage tank 10 in a state of having a high temperature without releasing heat to the water in the lower portion of the hot-water storage tank 10. That is, even if the temperature of the whole of the hot-water storage tank 10 is not raised, high-temperature hot water can be stored. In the case where hot water is added, the additional hot water that is returned to the hot-water storage tank 10 is heated to a predetermined preset temperature so as not to decrease the temperature of the hot water in the upper portion of the hot-water storage tank 10. The preset temperature is set by the user's input or automatically by the pump controller 121 or the like. That is, in this embodiment, heating action in which the temperature of water is raised by one-time heating is performed so that the temperature of the hot water flowing out of the water heating heat exchanger 8 detected by the temperature sensor 211 corresponds to the preset temperature. Such a heating method is called once-through heating. During the once-through heating, the flow rate of the water flowing in the water heating heat exchanger 8 may be controlled by the water pump 9 so that the temperature of the hot water flowing out of the water heating heat exchanger 8 corresponds the preset temperature. The flow rate described here means a volumetric flow rate.

During the once-through heating, since water is heated to a high temperature by one-time heat exchange, the temperature of the hot water flowing out of the water heating heat exchanger 8 is continuously equal to or close to the preset temperature. Thus, the temperature of the heating medium flowing into the water heating heat exchanger 8 needs to be continuously high. So the heat pump unit 301 continuously heats the heating medium to a high temperature. As the temperature of the heating medium flowing out of the condenser 2 increases, the operation efficiency of the heat pump unit 301 decreases. The heat pump heating and hot-water system 100 of the first embodiment, by achieving the operation conditions described below, makes it possible that the decrease in operation efficiency is suppressed, and thereby the heat pump unit 301 is operated with high operation efficiency. Specifically, the temperature of the heating medium flowing into the condenser 2 is decreased, and the expansion valve 3 is throttled to decrease the high-pressure liquid refrigerant temperature, whereby the specific enthalpy difference of refrigerant in the condenser 2 is increased, and thereby the operation efficiency is enhanced. In the following, the method for achieving the operation conditions is explained.

Figure 5:
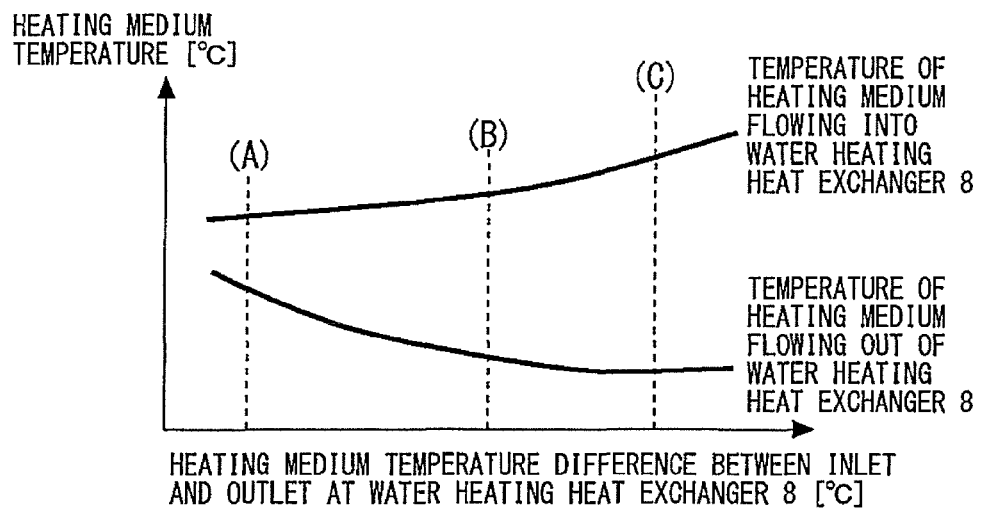
FIG. 5 is a graph showing a relationship among a heating medium temperature difference between inlet and outlet at a water heating heat exchanger, a temperature of the heating medium flowing into the water heating heat exchanger, and a temperature of the heating medium flowing out of the water heating heat exchanger during the hot-water accumulating operation mode of the heat pump heating and hot-water system in accordance with the first embodiment of the present invention.

First, there is explained an operation for decreasing the temperature of the heating medium flowing into the condenser 2. When the temperature of the heating medium flowing into the condenser 2 is low, the temperature of the heating medium flowing out of the water heating heat exchanger 8 is also low. FIG. 5 is a graph in which the abscissas represent the difference between the temperature of the heating medium flowing into the water heating heat exchanger 8 and the temperature of the heating medium flowing out of the water heating heat exchanger 8 (hereinafter, referred to as the "heating medium temperature difference between inlet and outlet"), and the ordinates represent the temperature of the heating medium flowing into the water heating heat exchanger 8 and the temperature of the heating medium flowing out of the water heating heat exchanger 8. When the rotational speed of the heating medium pump 6 is decreased and the flow rate of the heating medium is reduced, the heating medium temperature difference between inlet and outlet at the water heating heat exchanger 8 increases. As shown in FIG. 5, as the heating medium temperature difference between inlet and outlet at the water heating heat exchanger 8 increases, the temperature of the heating medium flowing into the water heating heat exchanger 8 increases, and the temperature of the heating medium flowing out of the water heating heat exchanger 8 decreases. The increment in the temperature of the heating medium flowing into the water heating heat exchanger 8 increases with the increase in the heating medium temperature difference between inlet and outlet at the water heating heat exchanger 8. The decrement in the temperature of the heating medium flowing out of the water heating heat exchanger 8 decreases with the increase in the heating medium temperature difference between inlet and outlet at the water heating heat exchanger 8. Herein, specifically, there is explained variations in the temperature of heating medium in operating states (A), (B) and (C) in FIG. 5. In the case of the operating state (A), the heating medium temperature difference between inlet and outlet is small, and the temperature of the heating medium flowing out of the water heating heat exchanger 8 is high. When the flow rate of the heating medium pump 6 is decreased from the operating state (A) to the operating state (B), the temperature of the heating medium flowing out of the water heating heat exchanger 8 decreases. However, when the flow rate of the heating medium pump 6 is further decreased to the operating state (C), although the temperature of the heating medium flowing out of the water heating heat exchanger 8 decreases further, the temperature of the heating medium flowing into the water heating heat exchanger 8 increases excessively. When the temperature of the heating medium flowing into the water heating heat exchanger 8 increases, the temperature of the heating medium flowing out of the condenser 2 also increases, so that the operation efficiency of the heat pump unit 301 decreases. Also, when the temperature of the heating medium flowing out of the condenser 2 increases, there is a possibility that the refrigerant pressure and refrigerant temperature increase excessively in the discharge part of the compressor 1, which may result in an abnormal stop of the heat pump unit 301 or a shortage of heating power for the heating medium. Thus, the condition in which the temperature of the heating medium flowing out of the condenser 2 is high is not a preferable operation condition. For this reason, the flow rate of heating medium pumped by the heating medium pump 6 is optimum in the case of the operating state (B). Thus, to prevent the temperature of the heating medium flowing out of the condenser 2 from increasing as in the operating state (C), it is preferable that the heating medium temperature difference between inlet and outlet at the water heating heat exchanger 8 be not larger than the temperature difference in the operating state (B).

Figure 6:
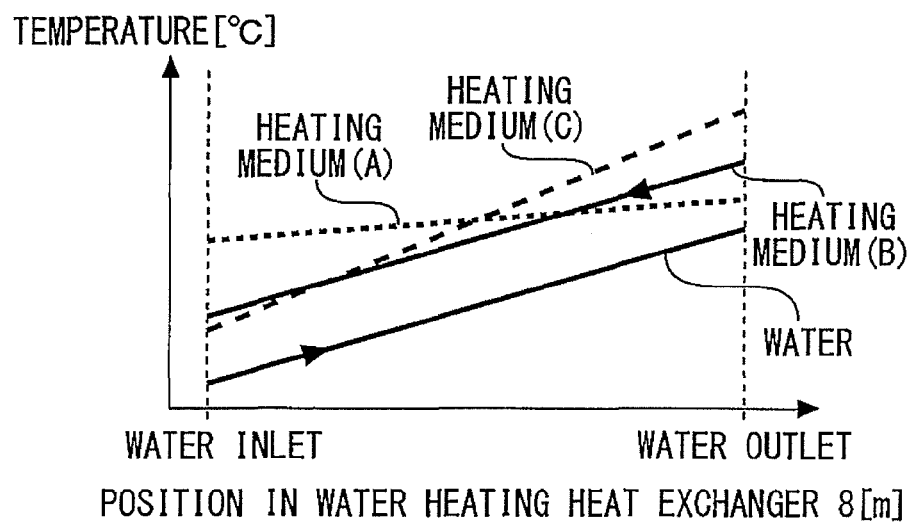
FIG. 6 is a graph showing an outline of temperature distributions of the heating medium and the water in the water heating heat exchanger during the hot-water accumulating operation mode of the heat pump heating and hot-water system in accordance with the first embodiment of the present invention.

What condition is the operating state (B) in FIG. 5 is explained in detail with reference to FIG. 6. FIG. 6 is a graph showing the outline of temperature distributions of the heating medium and the water in the water heating heat exchanger 8. Symbols (A), (B) and (C) in FIG. 6 correspond to the operating states (A), (B) and (C) in FIG. 5. As shown in FIG. 6, in the operating state (A) in which the flow rate of heating medium is high, the heating medium temperature difference between inlet and outlet is small. In this the operating state (A), the heating medium temperature difference between inlet and outlet is smaller than the difference between the temperature of the water (hot water) flowing out of the water heating heat exchanger 8 and the temperature of the water flowing into the water heating heat exchanger 8 (hereinafter, referred to as the "water temperature difference between inlet and outlet"). In this case, when the flow rate of the heating medium is decreased from the operating state (A) to the operating state (B), the heating medium temperature difference between inlet and outlet and the water temperature difference between inlet and outlet at the water heating heat exchanger 8 become equal to each other, and at any positions in the water heating heat exchanger 8, the difference in temperature between heating medium and water becomes equal. The state in which the difference in temperature between heating medium and water is constant at any positions in the water heating heat exchanger 8 means that the heating medium has no heat exchange portion in an excessively high temperature state and means the operation with a minimum irreversible loss. Thus, in the case of the operating state (B), the operation efficiency of the heat pump unit 301 can be made the highest.

Hence, it is preferable that, by adjusting the flow rate of heating medium pumped by the heating medium pump 6 to achieve the operating state (B), the temperature of the heating medium flowing out of the water heating heat exchanger 8 is decreased and the temperature of the heating medium flowing into the condenser 2 is decreased. If the temperature of the heating medium flowing into the condenser 2 can be decreased, the high-pressure liquid refrigerant temperature, which is the temperature of the refrigerant at the outlet of the condenser 2 of the refrigerant circuit 51, can also be decreased by throttling the expansion valve 3. Next, the operation for decreasing the high-pressure liquid refrigerant temperature is explained.

Figure 7:
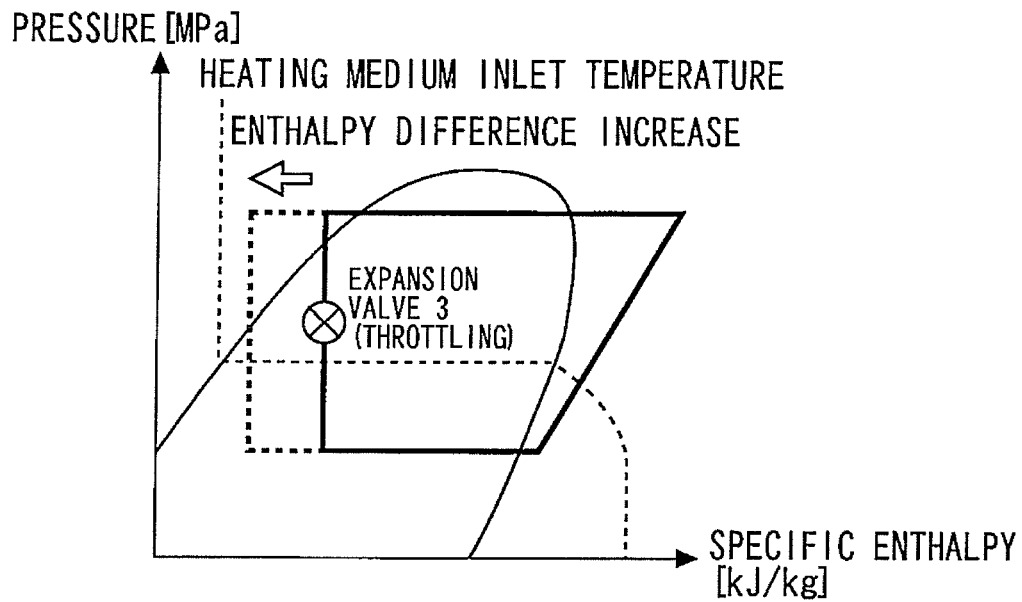
FIG. 7 is a graph showing an enthalpy difference increase effect brought about by throttling an expansion valve during the hot-water accumulating operation mode of the heat pump heating and hot-water system in accordance with the first embodiment of the present invention.

As the method for decreasing the high-pressure liquid refrigerant temperature, concerning the heat pump unit 301, the target value of high-pressure liquid refrigerant temperature is set depending on the temperature of the heating medium flowing into the condenser 2, and the expansion valve 3 is controlled so that the high-pressure liquid refrigerant temperature corresponds to the target value. The high-pressure liquid refrigerant temperature is detected by the temperature sensor 203, and the temperature of the heating medium flowing into the condenser 2 is detected by the temperature sensor 206. The high-pressure liquid refrigerant temperature is decreased by throttling the expansion valve 3. The effect brought about by the decrease in the high-pressure liquid refrigerant temperature is shown in FIG. 7. The target value of high-pressure liquid refrigerant temperature may be a value, for example, 3° C. higher than the temperature of the heating medium flowing into the condenser 2. In the case where the temperature of the heating medium flowing into the condenser 2 is low, the target value of high-pressure liquid refrigerant temperature is also made low. Thus, the action for throttling the expansion valve 3 is carried out, and the specific enthalpy difference of refrigerant in the condenser 2 is increased. If the target value of high-pressure liquid refrigerant temperature is brought too close to the temperature of the heating medium flowing into the condenser 2, the high pressure rises, and the operation efficiency decreases. Thus, it is preferable that the target value of high-pressure liquid refrigerant temperature is set higher by a predetermined value (for example, about 3° C.) than the temperature of the heating medium flowing into the condenser 2.

By doing above, the high-pressure liquid refrigerant temperature can be decreased, and the heat pump unit 301 can be operated so that the operation efficiency thereof is at the maximum. In this case, in order to achieve such an action in once-through heating, the flow rate of heating medium and the flow rate of water may be regulated so that the operating state (B) is achieved. Also, from the viewpoints of improving the reliability of the heat pump unit 301 and avoiding an excessive rise in temperature of the heating medium flowing into the water heating heat exchanger 8, the operating state (A) or the operating state (B) is preferable. For this purpose, it is necessary to properly select the water pump 9 and the heating medium pump 6 to configure the heat pump heating and hot-water system 100. Next, the selection of the water pump 9 and the heating medium pump 6 is explained.

<Selection of Water Pump>

First, the selection of the water pump 9 is explained. The water flowing in the hot-water accumulating circuit 53 during the hot-water accumulating operation mode is heated to the preset temperature by one-time heat exchange in the water heating heat exchanger 8. The water pump 9 capable of controlling the flow rate of water to a flow rate that can achieve this condition is selected. As an example, if the heating power of the heat pump unit 301 is assumed to be 9 kW, the amount of exchange heat between refrigerant and heating medium in the condenser 2 is 9 kW, and the amount of exchange heat between heating medium and water in the water heating heat exchanger 8 is also 9 kW. As an example, if the temperature of the water flowing into the water heating heat exchanger 8 is assumed to be 15° C., and the preset temperature is assumed to be 55° C., since the specific heat of water is 4.18 kJ/kgK, and the density of water is 1000 kg/m$^3$, the necessary flow rate of water is 3.23 liters/min.

That is, in the case of this example, there is selected the water pump 9 in which the flow rate of the water flowing in the water heating heat exchanger 8 in the hot-water accumulating circuit 53 can be made about 3.23 liters/min.

Figure 8:
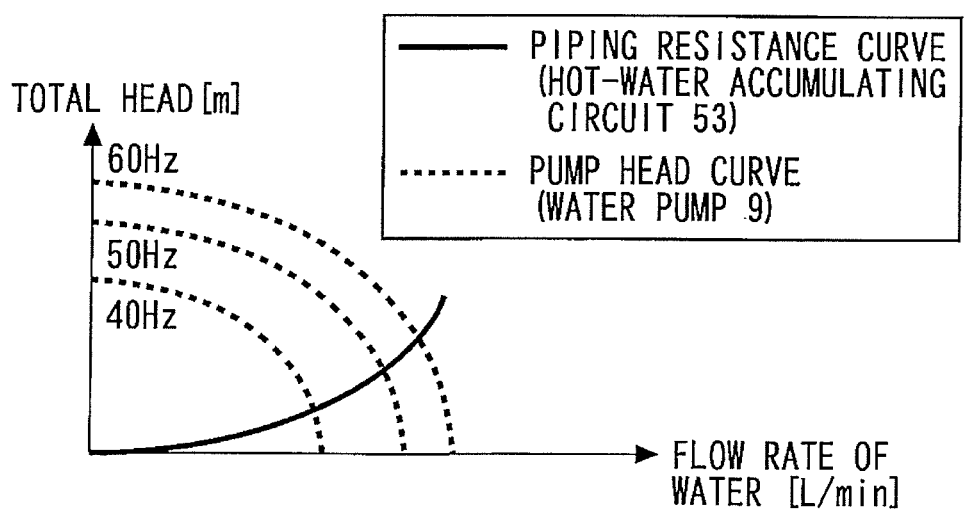
FIG. 8 is a graph showing a pump characteristic curve of a water pump during the hot-water accumulating operation mode of the heat pump heating and hot-water system in accordance with the first embodiment of the present invention.

When the water pump 9 is selected, the selection is made by considering the piping resistance of the hot-water accumulating circuit 53 as well. FIG. 8 is a graph showing the pump characteristic curve of the water pump 9. A curve showing the total resistance of pipes of the hot-water accumulating circuit 53 is a piping resistance curve. The intersection point of the piping resistance curve and a pump head curve is a point at which the capacity of the water pump 9 and the total resistance of piping are in balance, and this point indicates the operation condition of the water pump 9. In this example, it is assumed that the rotational speed of the water pump 9 can be varied by inverter control. For example, if the rotational speed of the water pump 9 is varied by changing the operating frequency thereof to 60 Hz, 50 Hz and 40 Hz, the pump head curve changes, and the intersection point of the piping resistance curve and the pump head curve shifts to the low flow rate side. Thus, the flow rate of the water flowing in the hot-water accumulating circuit 53 is reduced. The pump head curve is determined depending on the particulars of the water pump 9. That is, the pump head curve can be determined according to the pump type and the pump capacity. The piping resistance curve is determined depending on the piping particulars (for example, the outside diameter, wall thickness, length, kind and number of pipe joints, and number of suddenly expanded portions and suddenly contracted portions) of the hot-water accumulating circuit 53. Since the hot-water accumulating circuit 53 is a part of the hot-water storage tank unit 302, the piping particulars of the hot-water accumulating circuit 53 are information that can be determined in advance at the time of designing. As described above, based on the pump characteristic curve and the piping resistance curve, there can be selected the water pump 9 in which the flow rate of the water flowing in the water heating heat exchanger 8 can take a preferable value (in the above-described example, 3.23 liters/min).

Next, the selection of the heating medium pump 6 is explained. In the operating state (B) of FIG. 6, the heating medium temperature difference between inlet and outlet and the water temperature difference between inlet and outlet at the water heating heat exchanger 8 are equal to each other. In this case, the heat releasing amount Qh of heating medium and the heating amount (heat receiving amount) Qw of water in the water heating heat exchanger 8 have the relationship described below.

$$Qh = Cph \times \rho h \times Vh \times (Thi - Tho) \quad \text{[Formula 1]}$$

$$Qw = Cpw \times \rho w \times Vw \times (Two - Twi) \quad \text{[Formula 2]}$$

In the formulas, Cph is the specific heat [kJ/kgK] of heating medium, $\rho h$ is the density [kg/m$^3$] of heating medium, Vh is the flow rate [m$^3$/sec] of heating medium, Thi is the temperature [° C.] of the heating medium flowing into the water heating heat exchanger 8, Tho is the temperature [° C.] of the heating medium flowing out of the water heating heat exchanger 8, Cpw is the specific heat [kJ/kgK] of water, $\rho w$ is the density [kg/m$^3$] of water, Vw is the flow rate [m$^3$/sec] of water, Twi is the temperature [° C.] of the water flowing into the water heating heat exchanger 8, and Two is the temperature [° c.] of the water flowing out of the water heating heat exchanger 8. Since the heating amount Qw of water and the heat releasing amount Qh of heating medium in the water heating heat exchanger 8 are equal to each other, if the heating medium temperature difference between inlet and outlet (Thi−Tho) and the water temperature difference between inlet and outlet (Two−Twi) are equal to each other, the heat capacity flow rate Cph×$\rho h$×Vh of heating medium and the heat capacity flow rate Cpw×$\rho w$×Vw of water are equal to each other. In the case where the heating medium temperature difference between inlet and outlet is smaller than the water temperature difference between inlet and outlet as in the operating state (A) of FIG. 6, the heat capacity flow rate of heating medium is higher than the heat capacity flow rate of water. Because of the above-described fact, in order to achieve the operating state (A) or (B) of FIG. 5, the heating medium pump 6 may be selected so that the heat capacity flow rate of heating medium is higher than or equal to the heat capacity flow rate of water. In the case of the above-described example, the flow rate of water pumped by the water pump 9 is 3.23 liters/min. Using the specific heat 4.18 kJ/kgK of water and the density 1000 kg/m$^3$ of water, the heat capacity flow rate of water is 0.23 kW/K. Thus, there is selected the heating medium pump 6 in which the heat capacity flow rate of heating medium can be made 0.23 kW/K or higher.

In the above-described example, in the case where water is used as the heating medium, since Cph=Cpw and $\rho h$=$\rho w$, there is selected the heating medium pump 6 in which the flow rate of heating medium can be made 3.23 liters/min or higher. To prevent freezing, in some cases, brine (antifreezing fluid) such as Naiburain, ethylene glycol, or propylene glycol is used as a heating medium. In this case, the heating medium pump 6 is selected as described below. As an example, the case where Naiburain having a concentration of 40% is used is explained. In the case where it is recognized, in the test, analysis, or the like at the time of designing, that the temperature of the heating medium flowing into the water heating heat exchanger 8 is 65° C., and the temperature of the heating medium flowing out of the water heating heat exchanger 8 is 25° C., the average temperature of heating medium is 45° C., and the specific heat at 45° C. of this heating medium is 3.78 kJ/kgK, and the density is 1031 kg/m$^3$. When calculation is made using these values of specific heat and density, in order to make the heat capacity flow rate of heating medium higher than or equal to the heat capacity flow rate 0.23 kW/K of water, the flow rate of heating medium may be 3.54 liters/min or higher. Thus, there is selected the heating medium pump 6 in which the flow rate of heating medium can be made 3.54 liters/min or higher. Generally, the specific heat of brine is less than that of water, and in the case of the same volumetric flow rate, the heat capacity flow rate of brine is lower than that of water. Thus, for any brine used as a heating medium, the heating medium pump 6 and the water pump 9 are selected so that the volumetric flow rate of heating medium that can be pumped to the water heating heat exchanger 8 by the heating medium pump 6 is higher than or equal to the volumetric flow rate of water that can be pumped to the water heating heat exchanger 8 by the water pump 9. By selecting the heating medium pump 6 and the water pump 9 so that the volumetric flow rate of heating medium that can be pumped to the water heating heat exchanger 8 by the heating medium pump 6 is higher than or equal to the volumetric flow rate of water that can be pumped to the water heating heat exchanger 8 by the water pump 9, the operating state (B) of FIG. 6 or an operating state close to the operating state (B) or an operating state at any one position between the operating state (B) and the operating state (A) can be achieved, so that the heat pump unit 301 can be operated with high efficiency.

In order to make the heat capacity flow rate of heating medium higher than or equal to the heat capacity flow rate of water, the heating medium pump 6 may be selected so that the flow rate (volumetric flow rate) of heating medium is higher than or equal to the flow rate (volumetric flow rate) of water. Even if the pump having the same particulars is used, the flow rate varies depending on the difference in piping configuration and piping resistance. Thus, considering the piping configuration and piping resistance as well, the heating medium pump 6 in which the flow rate of heating medium can be made higher than or equal to the flow rate of water is selected.

Figure 9:
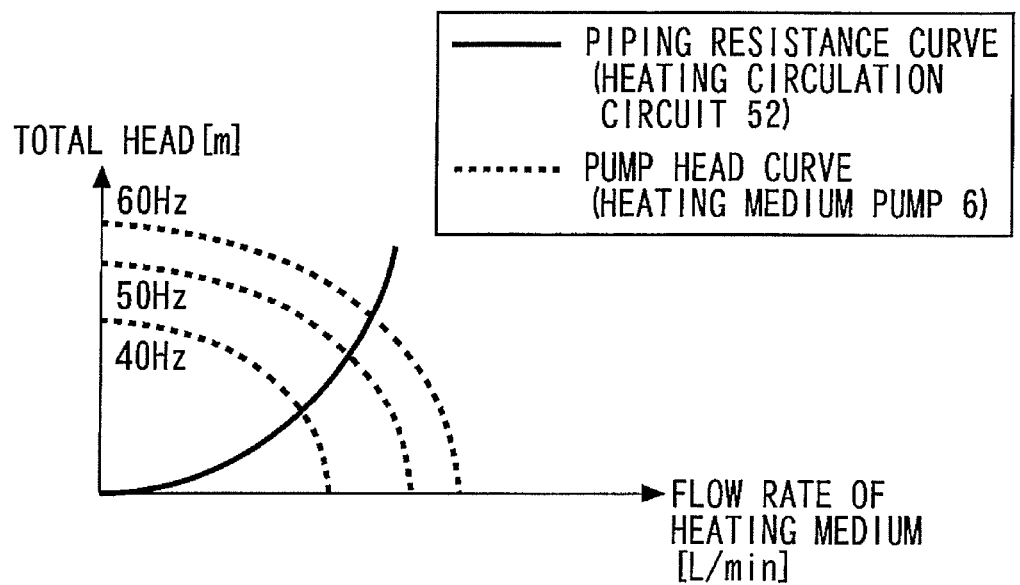
FIG. 9 is a graph showing a pump characteristic curve of a heating medium pump during the hot-water accumulating operation mode of the heat pump heating and hot-water system in accordance with the first embodiment of the present invention.

FIG. 9 is a graph showing the pump characteristic curve of the heating medium pump 6. The piping resistances of the heating circulation circuit 52 is likely to be high because the length thereof, especially at the heating medium pipes 303 and 304, is likely to be long. Thus, in the case where pumps having the same particulars are selected as the heating medium pump 6 and the water pump 9, the flow rate of the heating medium in the heating circulation circuit 52 is likely to be lower than the flow rate of the water in the hot-water accumulating circuit 53. For this reason, the heating medium pump 6 may be selected considering the piping resistance of the heating circulation circuit 52. If the installation places of the heat pump unit 301 and the hot-water storage tank unit 302 are decided, the lengths of the heating medium pipes 303 and 304 are determined. If the flow rate of heating medium necessary for the heating circulation circuit 52 is determined, the diameter of piping of the heating circulation circuit 52 is determined. Since the piping length and piping diameter are determined in this manner, the piping resistance at the time when the necessary flow rate of heating medium is caused to flow can be determined. Since all of these parameters can be grasped at the design stage, the pump capable of outputting the total head corresponding to the piping resistance at the time when the necessary flow rate of heating medium is caused to flow can be determined. In this manner, the heating medium pump 6 can be selected so that the volumetric flow rate of heating medium that can be pumped to the water heating heat exchanger 8 by the heating medium pump 6 is higher than or equal to the volumetric flow rate of water that can be pumped to the water heating heat exchanger 8 by the water pump 9.

Thus, the heating medium pump 6 and the water pump 9 can be selected. In the first embodiment, the configuration is such that one heating medium pump 6 and one water pump 9 are arranged; however, the number of pumps and the method for connecting these pumps are not limited to this embodiment. For example, the configuration may be such that two or more of the heating medium pumps 6 are connected in parallel, two or more of the water pumps 9 are connected in series, and during the hot-water accumulating operation mode, the heat capacity flow rate of heating medium is made higher than the heat capacity flow rate of water.

In order to improve the reliability of piping, it is preferable that the flow velocity of fluid flowing in the piping be kept at a value within the predetermined range. Specifically, in the case where the flow velocity of fluid is low, for example, in the case where the flow velocity of fluid is 0.5 m/sec or lower, the low flow velocity causes pitting. In the case where the flow velocity of fluid is high, for example, in the case where the flow velocity of fluid is 1.2 m/sec or higher, the high flow velocity causes erosion. In the first embodiment, since the flow rate of heating medium in the heating circulation circuit 52 is higher than or equal to the flow rate of water in the hot-water accumulating circuit 53, in order to make the flow velocity of heating medium in the pipes of the heating circulation circuit 52 proper, it is preferable that the inside diameter of pipes constituting the heating circulation circuit 52, for example, the inside diameters of the heating medium pipes 303 and 304 is higher than or equal to the inside diameters of the water pipes 310 and 311 constituting the hot-water accumulating circuit 53. By doing this, both of the flow velocity of heating medium in the pipes of the heating circulation circuit 52 and the flow velocity of water in the pipes of the hot-water accumulating circuit 53 can be made in a proper range, so that the reliability of piping is improved.

<Method for Controlling Operation of Heating Medium Pump 6>

In the case where the heating medium pump 6 is of a fixed speed type, the operating state varies between the operating state (B) and the operating state (A) of FIG. 6 depending on the temperature of the water flowing into the water heating heat exchanger 8 and the temperature of the water flowing out of the water heating heat exchanger 8. In contrast, in the case where the heating medium pump 6 is of a variable speed type, in all situations, the operating state (B) of FIG. 6 may be achieved by controlling the rotational speed, so that the heat pump unit 301 can be operated with higher efficiency. Also, with respect to the refrigerant of the heat pump unit 301, abnormal operation caused by an excessive rise in high pressure and an excessive rise in discharge temperature can be prevented reliably by carrying out control, as in the operating state (A), so that the heating medium temperature difference between inlet and outlet is smaller than the water temperature difference between inlet and outlet. In the following, above method for controlling operation is explained.

In the operating state (B), the heating medium temperature difference between inlet and outlet and the water temperature difference between inlet and outlet at the water heating heat exchanger 8 are equal to each other. If the temperature of the heating medium flowing into the water heating heat exchanger 8, the temperature of the heating medium flowing out of the water heating heat exchanger 8, the temperature of the water flowing into the water heating heat exchanger 8, and the temperature of the water flowing out of the water heating heat exchanger 8 can be obtained, the operating state (B) or the operating state (A) can be achieved, in all situations, by controlling the rotational speed of the heating medium pump 6 using the controlling means 127 of the pump controller 121 so that the heating medium temperature difference between inlet and outlet at the water heating heat exchanger 8 is smaller than or equal to the water temperature difference between inlet and outlet. In the first embodiment, the temperature of the heating medium flowing into the water heating heat exchanger 8 can be obtained by the temperature sensor 208, the temperature of the heating medium flowing out of the water heating heat exchanger 8 can be obtained by the temperature sensor 209, the temperature of the water flowing into the water heating heat exchanger 8 can be obtained by the temperature sensor 210, and the temperature of the water flowing out of the water heating heat exchanger 8 can be obtained by the temperature sensor 211.

If the temperature sensor 210 is not provided, the temperature detected by the temperature sensor installed in the lowermost portion of the hot-water storage tank 10 (in the configuration shown in the figure, the temperature sensor 215) of the temperature sensors installed in the hot-water storage tank 10 can be used as the temperature of the water flowing into the water heating heat exchanger 8. If the temperature sensor 208 and the temperature sensor 209 are not provided, the temperature detected by the temperature sensor 207 can be used as the temperature of the heating medium flowing into the water heating heat exchanger 8, and the temperature detected by the temperature sensor 206 can be used as the temperature of the heating medium flowing out of the water heating heat exchanger 8. In this case, the detected values of the temperature sensors 206 and 207 are transmitted by the communicating means 103 of the heat pump controller 101, and are received by the communicating means 125 of the pump controller 121.

The operating state (B) or the operating state (A) of FIG. 6 also can be achieved by carrying out control so that the volumetric flow rate of heating medium in the water heating heat exchanger 8 is higher than or equal to the volumetric flow rate of water. In the following, the method for obtaining the volumetric flow rates of water and heating medium is explained.

The method for obtaining the flow rate of water is as described below. First, the pump characteristic curve of the water pump 9 shown in FIG. 8 is stored in the storing means 123 of the pump controller 121. Specifically, for the pump head curve, the data table of the water flow rate and the total head is stored for each rotational speed, and for the piping resistance curve, the data table of the water flow rate and the total head is stored. Since the piping resistance curve is determined depending on the piping configuration of the hot-water accumulating circuit 53, and the pump head curve is determined depending on the water pump 9, the piping resistance curve and the pump head curve can be grasped in advance at the design stage. The flow rate of water is calculated from the pump characteristic curve of the water pump 9 and the rotational speed of the water pump 9.

The method for obtaining the flow rate of heating medium is as described below. First, the pump characteristic curve of the heating medium pump 6 shown in FIG. 9 is stored in the storing means 123 of the pump controller 121. Specifically, for the pump head curve, the data table of the heating medium flow rate and the total head is stored for each rotational speed, and for the piping resistance curve, the data table of the heating medium flow rate and the total head is stored. Since the pump head curve is determined depending on the heating medium pump 6, the pump head curve can be grasped in advance at the design stage. The piping resistance curve is determined depending on the piping configuration of the heating circulation circuit 52. The heating circulation circuit 52 includes the heating medium pipes 303, 304, 306 and 307 for connecting the heat pump unit 301, the hot-water storage tank unit 302, and the indoor heating units 305a and 305b. The specifications of these heating medium pipes 303, 304, 306 and 307 are determined at the time of installation at the site. Thus, in addition to the particulars of piping in the heat pump unit 301 and the hot-water storage tank unit 302, which are known in advance at the design time, the length, outside diameter, wall thickness, kind and number of pipe joints, number of suddenly expanded portions and suddenly contracted portions, and the like of each of the heating medium pipes 303, 304, 306 and 307, which are installed by the installer at the time of installation at the site, are inputted to the input means 124 of the pump controller 121. By doing this, the data table for the piping resistance curve can be determined from these values. Thus, the information on the pump head curve and piping resistance curve can be obtained. The flow rate of heating medium is calculated from the pump characteristic curve of the heating medium pump 6 and the rotational speed of the heating medium pump 6.

The flow rate of water and the flow rate of heating medium can be obtained in this manner. By making the flow rate of heating medium higher than or equal to the flow rate of water, an operating state corresponding to the operating state (B) or an operating state close to the operating state (B) can be achieved. This make it possible to operate the heat pump unit 301 with the maximum operation efficiency. Also, an operating state corresponding to the operating state (A) can be achieved and the heat pump unit 301 can reliably prevented from being operated abnormally. In the operating state (B), as described above, the heat capacity flow rate of heating medium and the heat capacity flow rate of water are equal to each other. Control accompanied by obtaining the information on the heat capacity flow rates of water and heating medium makes it possible to achieve the operating state (B) with higher accuracy. Since the heat capacity flow rate is density×specific heat×volumetric flow rate, in addition to the information on the volumetric flow rate, the information on the specific heat and density is needed. In the following, the method for obtaining the specific heat and density of water and heating medium is explained.

The specific heat and density of water, which is a fluid flowing in the hot-water accumulating circuit 53, are determined easily so as to be 4.18 kJ/kgK and about 1000 kg/m$^3$, respectively. Also, in the case where water is used as the heating medium flowing in the heating circulation circuit 52, the specific heat and density thereof are determined easily so as to be 4.18 kJ/kgK and about 1000 kg/m$^3$, respectively. In contrast, in the case where brine is used as the heating medium, the specific heat and density thereof vary depending on the type, concentration, and temperature of brine. Thus, the type and concentration of heating medium are inputted to the input means 124 of the pump controller 121 at the time of installation at the site, and are stored in the storing means 123. The specific heat and density of heating medium can be obtained based on the temperature and the inputted information. The temperature of heating medium is obtained based on estimating the average temperature of heating medium in the water heating heat exchanger 8 at the system design stage. The density and specific heat of heating medium may be determined according to the estimated average temperature. At the design stage, the heating power of the heat pump unit 301, the particulars of the water heating heat exchanger 8, the temperature of the water flowing into the water heating heat exchanger 8, and the temperature of the water flowing out of the water heating heat exchanger 8 are estimated. Thus, the temperature of the heating medium flowing into the water heating heat exchanger 8 and the temperature of the heating medium flowing out of the water heating heat exchanger 8 can also be estimated. Thus, the estimated average temperature of heating medium in the water heating heat exchanger 8 can be determined. The estimated average temperature is stored by the storing means 123 of the pump controller 121.

Also, the average temperature of heating medium in the water heating heat exchanger 8 can be estimated using the information of the temperature sensors as described below, and the density and specific heat of brine (heating medium) may be determined using the estimated average temperature. In the case where the outlet temperature of heating medium and the outlet temperature of water at the water heating heat exchanger 8 are available, the mean value of these two temperatures may be used. Further, if the temperature sensor 209 is not provided, and the temperature of the temperature sensor 206 cannot be obtained from the heat pump unit 301, so that the outlet temperature of heating medium is unknown, the outlet temperature of water may be used as the estimated average temperature of heating medium. If both of the temperature sensor 208 or 207 and the temperature sensor 209 are provided, the temperature of the heating medium flowing into the water heating heat exchanger 8 and the temperature of the heating medium flowing out of the water heating heat exchanger 8 are available, and the average temperature can be estimated with high accuracy. That is, the temperature of heating medium or water is detected by a detecting means of the pump controller 121, the estimated average temperature of heating medium is calculated by the calculating means 126 based on the detected information, and the calculated estimated average temperature of heating medium is stored in the storing means 123. The data on the specific heat and density of brine are stored in the storing means 123 of the pump controller 121 as a data table of concentration and temperature for each type of brine. By doing above, the specific heat and density of brine (heating medium) can be determined. For example, in the case where the heating medium is Naiburain having a concentration of 40%, and the estimated average temperature is 45° C., the specific heat of heating medium is 3.78 kJ/kgK, and the density thereof is 1031 kg/m$^3$.

Thus, the specific heats and densities of water and heating medium can be obtained, and by multiplying these values by the volumetric flow rate, the heat capacity flow rate can be determined. By controlling the rotational speed of the heating medium pump 6 using the controlling means 127 so that the heat capacity flow rate of heating medium and the heat capacity flow rate of water are equal to each other, the operating state (B) can be achieved with high accuracy, so that the operation efficiency of the heat pump unit 301 can be made at the maximum.

In the above explanation, for the calculation to determine the flow rate of heating medium, the pump characteristic curve of the heating medium pump 6 is used. Since the piping resistance varies depending on the lengths of the heating medium pipes 303 and 304 installed at the site, in order to use the pump characteristic curve, information may be inputted by the installer at the site. However, it is thought that, in some cases, it is desired to make the installation work at the site easy. In this case, if the heating medium temperature difference between inlet and outlet at the water heating heat exchanger 8 and the heating power of the heat pump unit 301 are known, the volumetric flow rate of heating medium can be determined without the use of the pump characteristic curve of the heating medium pump 6 and the operation of the heating medium pump 6 can be controlled. This method is a good one if being used in the case where the temperature sensor 210 or 211 is not provided and therefore the water temperature difference between inlet and outlet is not available.

The hot-water accumulating operation mode of the heat pump unit 301 is designed in advance so that the heating power of the heat pump unit 301, that is, the heating power for the heating medium at the condenser 2 is continuously equivalent to the predetermined heating power target, and according to the design, the compressor 1, the expansion valve 3, the blower 5, and the like of the heat pump unit 301 are operated. For example, if the heat pump unit 301 is a 3-HP unit, the operation is performed so that the heating power is 9 kW. Also, some of the heat pump units 301 are set in advance before operation using a switch or the like so as to achieve the predetermined heating power. In this case, the heating power of the 3-HP heat pump unit 301 may be 8 kW or 7 kW. In either case, the heating power target of the heat pump unit 301 is determined in advance before operation. If the operational characteristics of the heating medium pump 6 and the piping resistance characteristics of the heating circulation circuit 52 are unknown, the flow rate of heating medium can be determined using the heating power target and the heating medium temperature difference between inlet and outlet at the water heating heat exchanger 8.

Specifically, the heat pump controller 101 transmits the heating power target of the heat pump unit 301 to the pump controller 121 using the communicating means 103. The pump controller 121 receives the heating power target using the communicating means 125. Alternatively, the predetermined heating power target may be stored in advance in the storing means 123 of the pump controller 121. Since the amount of heat applied to the heating medium in the condenser 2 and the amount of heat released from the heating medium in the water heating heat exchanger 8 are equal to each other in the steady-state condition, the exchange heat amount of the water heating heat exchanger 8 is approximately equal to the heating power of the heat pump unit 301, that is, the heating power target thereof. We have the following formula. Exchange heat amount [kW] =heat capacity flow rate [kW/K]×temperature difference between inlet and outlet [K]. The heating medium temperature difference between inlet and outlet at the water heating heat exchanger 8 is determined from the inlet temperature detected by the temperature sensor 208 and the outlet temperature detected by the temperature sensor 209. Thus, the heat capacity flow rate of heating medium is determined. The volumetric flow rate of heating medium may be determined from the relationship of heat capacity flow rate=specific heat×density×volumetric flow rate using the specific heat and density of water even if the heating medium is brine. In the case where the heating medium is brine, the volumetric flow rate determined in this manner is lower than the actual value. For example, in the case where the exchange heat amount is 9 kW and the temperature difference between inlet and outlet is 40° C., the heat capacity flow rate is 0.23 kW/K. If the heating medium is Naiburain having a concentration of 40% and the temperature thereof is 45° C., the specific heat thereof is 3.78 kJ/kgK and the density thereof is 1031 kg/m$^3$. In this case the actual flow rate of heating medium is 3.54 liters/min. In contrast, in the case where the actual heating medium is Naiburain having a concentration of 40% and the flow rate of heating medium is calculated using the specific heat 4.18 kJ/kgK of water and the density 1000 kg/m$^3$ of water, the calculated flow rate of heating medium is 3.23 liters/min. The flow rate of water can be determined from the pump characteristic curve in the same manner as described above. Thus, the flow rate of heating medium and the flow rate of water are obtained, and the rotational speed of the heating medium pump 6 can be controlled by the controlling means 127 so that the flow rate of heating medium is higher than or equal to the flow rate of water. If the calculation is made using the specific heat and density of water as described above in the case where the heating medium is brine, the calculated flow rate of heating medium is lower than the actual value. Thus, if the control is carried out so that the flow rate of heating medium calculated using the specific heat and density of water is higher than or equal to the flow rate of water, the actual flow rate of heating medium is higher than or equal to the flow rate of water. Also, as can be seen from the above-described calculation example, the difference in calculation result of flow rate is as small as, for example, about 0.31 liter/min (3.54 liters/min−3.23 liters/min=0.31 liter/min). Thus, the error in the case where the flow rate of heating medium is calculated using the specific heat and density of water is small, so that no problem arises. By doing above, an operating state corresponding to the operating state (B) or an operating state close to the operating state (B) can be achieved. This make it possible to operate the heat pump unit 301 with the maximum operation efficiency. Also, an operating state corresponding to the operating state (A) can be achieved and the heat pump unit 301 can reliably prevented from being operated abnormally.

If it is desired to achieve the operating state (B) with higher accuracy, the heat capacity flow rates of heating medium and water may be obtained. The heat capacity flow rate of heating medium can be obtained in the same manner as described above. That is to say, using the relationship of exchange heat amount [kW]=heat capacity flow rate [kW/K]×temperature difference between inlet and outlet [K], the heat capacity flow rate of heating medium can be determined from the heating power of the heat pump unit 301, that is, the heating power target thereof, and the heating medium temperature difference between inlet and outlet at the water heating heat exchanger 8. The heat capacity flow rate of water can be obtained as described below. The flow rate of water can be determined from the pump characteristic curve in the same manner as described above. The specific heat and density of water are known. Thus, the heat capacity flow rates of heating medium and water can be obtained. The rotational speed of the heating medium pump 6 is controlled by the controlling means 127 so that the heat capacity flow rate of heating medium is higher than or equal to the heat capacity flow rate of water. By doing above, the operating state (B) can be achieved with higher accuracy, and the operation efficiency of the heat pump unit 301 can be made at the maximum.

If both of the rotational speed of the heating medium pump 6 and the rotational speed of the water pump 9 fluctuate frequently, the stability of system may be deteriorated and an unstable condition including hunting may arise. To suppress this condition, the intervals between controls of the heating medium pump 6 may be longer than or equal to the intervals between controls of the water pump 9. For example, the intervals between the controls of the heating medium pump 6 may be, two times or three times or more, longer than or equal to the intervals between the controls of the water pump 9. By doing this, the heating medium pump 6 can be operated in relatively steady condition and the system can be operated more stably. From this point of view, the controlling means 127 of the pump controller 121 may preferably carry out the control so that the frequency of changes in rotational speed of the heating medium pump 6 per a predetermined time is lower than or equal to the frequency of changes in rotational speed of the water pump 9 per the predetermined time. For example, the intervals between the controls of the water pump 9 may be set at 15 seconds, and the intervals between the controls of the heating medium pump 6 may be set at 120 seconds.

If both of the rotational speed of the heating medium pump 6 and the operating frequency of the compressor 1 fluctuate frequently, the stability of system may be deteriorated and an unstable condition including hunting may arise. To suppress this condition, the intervals between the controls of the heating medium pump 6 may be longer than or equal to the intervals between controls of the compressor 1. For example, the intervals between the controls of the heating medium pump 6 may be, two times or three times or more, longer than or equal to the intervals between controls of the compressor 1. By doing this, the heating medium pump 6 can be operated in relatively steady condition and the system can be operated more stably. From this point of view, the controlling means 127 of the pump controller 121 may preferably carry out the control so that the frequency of the changes in rotational speed of the heating medium pump 6 per a predetermined time is lower than or equal to the frequency of changes in operating frequency of the compressor 1 per the predetermined time. For example, the intervals between the controls of the compressor 1 may be set at 60 seconds, and the intervals between the controls of the heating medium pump 6 may be set at 120 seconds.

Also, as a method for increasing the stability of system, not only the intervals between the controls of the heating medium pump 6 may be lengthened, but also the magnitude of each change in rotational speed of the heating medium pump 6 may be restricted. For example, the rotational speed of the heating medium pump 6 may be prohibited from changing by 5% or more compared to the preceding value. By doing above, the rotational speed of the heating medium pump 6 is changed little by little, so that an unstable operation including hunting can be suppressed, and the stability of system is improved.

By configuring the system of the first embodiment as explained above, the indoor heating operation and the hot-water accumulating operation can be performed, and high-efficiency hot-water accumulating operation can be performed. Specifically, by using the water heating heat exchanger 8 installed on the outside of the hot-water storage tank 10, the heat transfer performance is improved. Also, by causing heating medium to flow in the heating circulation circuit 52 and by causing water to flow in the hot-water accumulating circuit 53 so that the flow rate of heating medium is higher than or equal to the flow rate of water, the temperature of the heating medium flowing into the heat pump unit 301 can be decreased. Thereby, the heat pump unit 301 can be operated so that the operation efficiency thereof is at the maximum, and the hot-water accumulating operation can be carried out with high operation efficiency. Also, since the water heating heat exchanger 8 is installed on the outside of the hot-water storage tank 10, when a trouble occurs in the water heating heat exchanger 8, the replacement work can be performed easily, so that the maintainability is also improved. Also, since not only the temperature of the whole water in the hot-water storage tank 10 is increased, but also the temperature of some water in the hot-water storage tank 10 can be increased, the necessary amount of hot water having a high temperature can be produced, and the heat loss of the hot-water storage tank 10 can be reduced.

Second Embodiment

Next, a second embodiment of the present invention will be described with reference to FIG. 10, mainly in terms of difference from the above-described first embodiment, and the same parts or the corresponding parts will be denoted by the same reference signs and will not be repeatedly described.

Figure 10:
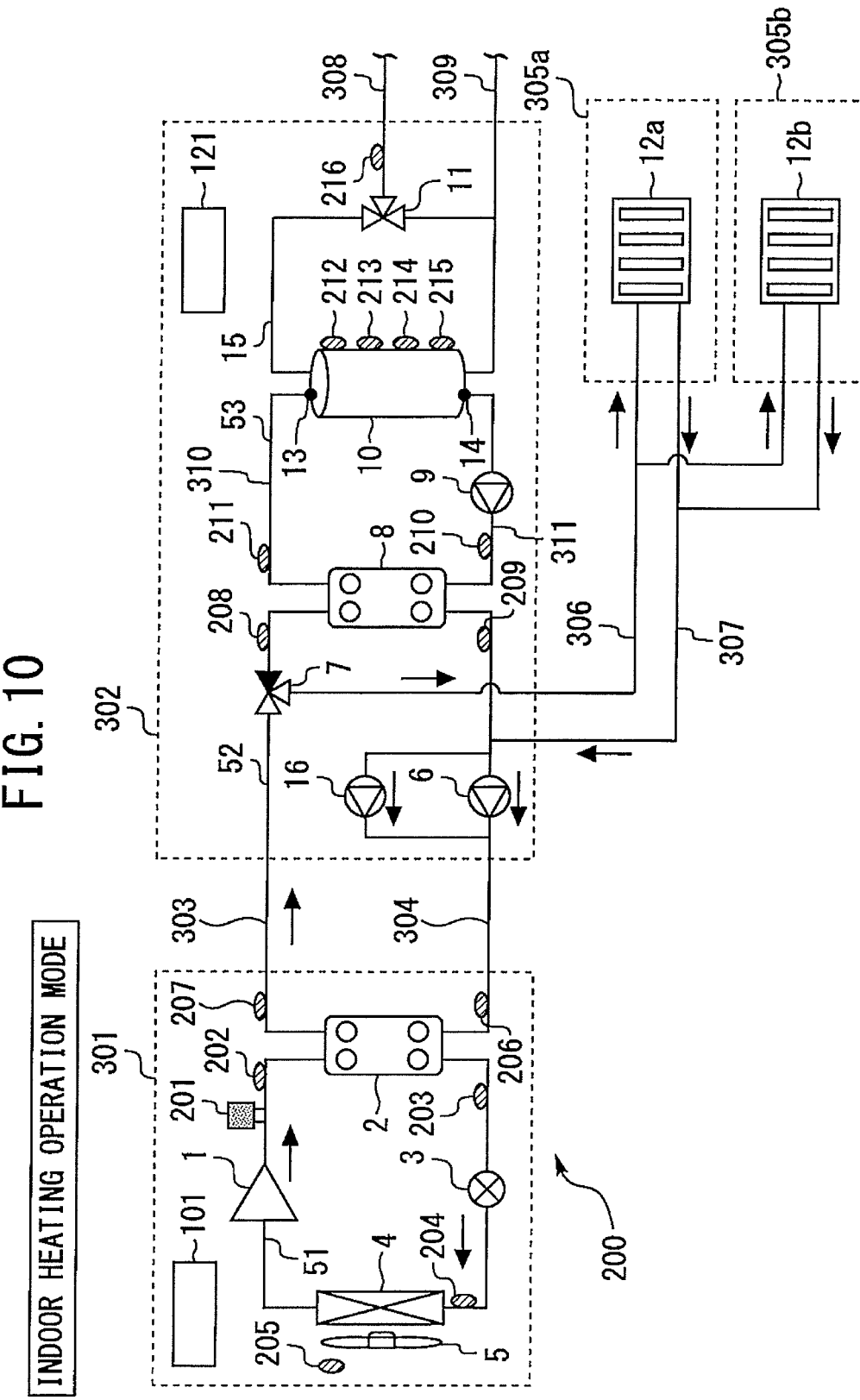
FIG. 10 is a system circuit diagram of a heat pump heating and hot-water system in accordance with a second embodiment of the present invention indicating flow directions of refrigerant and heating medium during an indoor heating operation mode.

FIG. 10 is a system circuit diagram of a heat pump heating and hot-water system 200 in accordance with the second embodiment of the present invention, especially being the system circuit diagram at the time of indoor heating operation mode. The arrow marks in FIG. 10 indicate the flow direction of the refrigerant. With reference to FIG. 10, the refrigerant circuit configuration of the heat pump heating and hot-water system 200 is explained.

As shown in FIG. 10, for the heat pump heating and hot-water system 200 in accordance with the second embodiment, a second heating medium pump 16 is connected in parallel to the heating medium pump 6 in the heating circulation circuit 52. The second heating medium pump 16 has a function of circulating heating medium in the heating circulation circuit 52, and may be of a variable speed type (for example, through inverter control) or may be of a fixed speed type. The second heating medium pump 16 operates during the indoor heating operation mode, and stands idle during the hot-water accumulating operation mode.

The heating medium pump 6 is selected so that, in the hot-water accumulating operation mode, the same operation as that of the first embodiment can be achieved. As explained in the first embodiment, in the hot-water accumulating operation mode, since water is heated to the preset temperature by one-time heat exchange in the water heating heat exchanger 8, the flow rate of the water pump 9 is generally low. Thus, as the heating medium pump 6 as well, a pump whose flow rate is low is selected. For this reason, if the indoor heating mode is executed with circulation of the heating medium pumped only by the heating medium pump 6, since the flow rate of heating medium is low, the temperature of the heating medium flowing into the condenser 2 may be undesirably high in some cases, and the operation efficiency of the heat pump unit 301 is deteriorated.

In the second embodiment, the second heating medium pump 16, in addition to the heating medium pump 6, is operated during the indoor heating operation mode. Thereby, the flow rate of heating medium sufficient to efficiently operate the heat pump unit 301 can be ensured during the indoor heating operation mode. The operation efficiency of the heat pump unit 301 during the indoor heating operation mode increases with decrease in the temperature of the heating medium flowing out of the heat pump unit 301. Thus, it is preferable that the flow rate of heating medium be increased so that the heating medium temperature difference between inlet and outlet in the condenser 2 can be kept, for example, at about 5° C. Assuming that the heating power of the condenser 2 is 9 kW, the heating medium is Naiburain having a concentration of 40%, and the average temperature of heating medium at the inlet and the outlet is 35° C., the specific heat of heating medium is 3.74 kJ/kgK, and the density of heating medium is 1036 kg/m³, so that the flow rate of heating medium in which the heating medium temperature difference between inlet and outlet in the condenser 2 is 5° C. is 27.87 liters/min. If the heating medium pump 6 capable of a flow rate of 6.93 liters/min has been selected, as the second heating medium pump 16, a pump capable of a flow rate of 20.94 litters/min may be selected.

Since the second embodiment has a configuration in which only the second heating medium pump 16 is added to the first embodiment, the operating state of the hot-water accumulating operation mode that is the same as that of the first embodiment can be achieved. In the second embodiment, therefore, high-efficiency operation can be carried out in both of the indoor heating operation mode and the hot-water accumulating operation mode.

Third Embodiment

Next, a third embodiment of the present invention will be described with reference to FIG. 11, mainly in terms of difference from the above-described first embodiment, and the same parts or the corresponding parts will be denoted by the same reference signs and will not be repeatedly described.

FIG. 11 is a system circuit diagram of a heat pump heating and hot-water system 300 in accordance with the third embodiment of the present invention, especially being the system circuit diagram at the time of hot-water accumulating operation mode. The arrow marks in FIG. 11 indicate the flow direction of the refrigerant. With reference to FIG. 11, the refrigerant circuit configuration of the heat pump heating and hot-water system 300 is explained.

As shown in FIG. 11, for the heat pump heating and hot-water system 300 in accordance with the third embodiment, a connection point 17, which is a flow inlet through which the water heated by the water heating heat exchanger 8 flows into the hot-water storage tank 10, is provided at a lower portion of the hot-water storage tank 10. Also, as the water pump 9, a water pump of a fixed speed type may be used. Because of such a configuration, for the heat pump heating and hot-water system 300 in accordance with the third embodiment, the method for heating water is different from that for the heat pump heating and hot-water system 100 in accordance with the first embodiment.

Specifically, the water heated by the water heating heat exchanger 8 flows into the hot-water storage tank 10 through the connection point 17 at the lower portion of the hot-water storage tank 10. There is low-temperature water in the lower portion of the hot-water storage tank 10. Since the water heated by the water heating heat exchanger 8 flows into the hot-water storage tank 10, the temperature of the whole water in the hot-water storage tank 10 rises. In the third embodiment, even if water is heated to a high temperature by the water heating heat exchanger 8, if the temperature of water in the hot-water storage tank 10 is low, high-temperature water cannot be stored in the hot-water storage tank 10. The hot-water accumulating operation in the third embodiment is an operating action for gradually raising the temperature of the whole water in the hot-water storage tank 10, and by carrying out heat exchange a plurality of times in the water heating heat exchanger 8, hot water is stored in the hot-water storage tank 10. This heating method is called cycle heating. In the cycle heating, the temperature of water is raised, for example, by 5° C. by the water heating heat exchanger 8, and the temperature of water in the hot-water storage tank 10 is raised. Thus, the temperature of the water flowing into the water heating heat exchanger 8 rises, for example, to 25° C., 30° C. and so on, and accordingly, the temperature of the water flowing out of the water heating heat exchanger 8 also rises to 30° C., 35° C. and so on. At the beginning of the cycle heating, the temperature of water in the hot-water storage tank 10 is low, and the temperature of the heating medium flowing into the water heating heat exchanger 8 and the temperature of the water flowing out of the water heating heat exchanger 8 are also low, so that the temperature of the heating medium flowing out of the condenser 2 and the temperature of the heating medium flowing into the condenser 2 are low. Thus, the heat pump unit 301 is in a state of having a high operation efficiency. Since the water heating method is different from that of the first embodiment, the method for operating the water pump 9 differs.

<Hot-Water Accumulating Operation Mode>

The flow directions of refrigerant, heating medium, and water in the hot-water accumulating operation mode in the third embodiment are similar to those of the first embodiment. The method for controlling the water pump 9 is as described below. To keep the temperature of the heating medium flowing into the water heating heat exchanger 8 low, the flow rate of water is increased, and the temperature of the water flowing out of the water heating heat exchanger 8 is decreased. That is, the water pump 9 operates at a constant flow rate, for example, such that the water temperature difference between inlet and outlet at the water heating heat exchanger 8 is about 5° C. In the case where the heating amount of the water heating heat exchanger 8 is 9 kW, taking the specific heat of water as 4.18 kJ/kgK, and taking the density of water as 1000 kg/m³, the necessary flow rate of water is 25.84 liters/min. Thus, as the water pump 9, a pump capable of a flow rate of 25.84 liters/min may be selected.

The heating medium pump 6 capable of the flow rate of heating medium higher than or equal to the flow rate of water may be needed in order to make the heating medium temperature difference between inlet and outlet at the water heating heat exchanger 8 smaller than or equal to the water temperature difference between inlet and outlet at the water heating heat exchanger 8 as in the first embodiment. That is to say, in the case where the flow rate of water pumped by the water pump 9 is 25.84 liters/min, as the heating medium pump 6, a pump capable of a flow rate of 25.84 liters/min or higher may be selected.

Also, in the control of the expansion valve 3 of the heat pump unit 301 as well, as in the first embodiment, the target value of high-pressure liquid refrigerant temperature may be set depending on either the temperature of the heating medium flowing into the condenser 2 or the temperature of the heating medium flowing out of the condenser 2, and the high-pressure liquid refrigerant temperature may be controlled using the expansion valve 3 so as to correspond to the target value. The target value of high-pressure liquid refrigerant temperature may be a value, for example, 3° C. higher than the temperature of the heating medium flowing into the condenser 2. Also, in the third embodiment, the heating medium pump 6 may be controlled so that the heating medium temperature difference between inlet and outlet at the water heating heat exchanger 8 is about 5° C. Thus, the heating medium temperature difference between inlet and outlet in the condenser 2 may be also about 5° C. In this case, since the temperature of the heating medium flowing into the condenser 2 is not so low, the expansion valve 3 may be controlled so that the degree of supercooling of the condenser 2 corresponds to a target value (for example, 2° C.). The degree of supercooling of the condenser 2 is a value obtained by subtracting the temperature detected by the temperature sensor 203 from the saturation temperature at the pressure detected by the pressure sensor 201.

By doing above, for the heat pump heating and hot-water system 300 of the third embodiment as well, the indoor heating operation and the hot-water accumulating operation can be carried out, and high-efficiency hot-water accumulating operation can be carried out. Specifically, using the water heating heat exchanger 8 installed on the outside of the hot-water storage tank 10, the heat transfer performance is improved. Since the temperature of the heating medium flowing into the heat pump unit 301 can be decreased, the heat pump unit 301 can be operated with high operation efficiency. Also, since the water heating heat exchanger 8 is installed on the outside of the hot-water storage tank 10, when a trouble occurs in the water heating heat exchanger 8, the replacement work can be performed easily, so that the maintainability is also improved.

REFERENCE SIGNS LIST 1 compressor
2 condenser
3 expansion valve
4 evaporator
5 blower
6 heating medium pump
7 three-way valve
8 water heating heat exchanger
9 water pump
10 hot-water storage tank
11 mixing valve
12a, 12b radiator
13, 14, 17 connection point
15 hot-water delivery pipe
16 second heating medium pump
51 refrigerant circuit
52 heating circulation circuit
53 hot-water accumulating circuit
100, 200, 300 heat pump heating and hot-water system
101 heat pump controller
102 measuring means
103 communicating means
104 calculating means
105 controlling means
121 pump controller
122 communicating means
123 storing means
124 input means
125 communicating means
126 calculating means
127 controlling means
201 pressure sensor
202, 203, 204, 205, 206, 207, 208, 209, 210, 211, 212, 213, 214, 215, 216 temperature sensor
301 heat pump unit
302 hot-water storage tank unit
303, 304, 306, 307 heating medium pipe
305a, 305b indoor heating unit
308 hot-water supply pipe
309 feed-water pipe
310, 311 water pipe

The invention claimed is:

1. A heat pump heating and hot-water system comprising:
a heat pump for heating a heating medium;
one or a plurality of heating medium pumps for pumping the heating medium;
a water heating heat exchanger for heating water by heat exchange between the heating medium and the water;
an indoor heating heat exchanger for warming a room by the heating medium;
a flow path switch configured to switch a destination of the heating medium between the water heating heat exchanger and the indoor heating heat exchanger;
a heating medium piping for connecting the heating medium pump(s), the water heating heat exchanger, the indoor heating heat exchanger, and the flow path switch;
a hot-water storage tank;
one or a plurality of water pumps for pumping the water;
a water piping for connecting the hot-water storage tank, the water pump(s), and the water heating heat exchanger, the water piping includes a piping circuit allowing the water taken out of the hot-water storage tank to go through the water heating heat exchanger and to return to the hot-water storage tank;
a heat pump controller for controlling the heat pump; and
a pump controller for controlling the heating medium pump(s) and the water pump(s),
wherein the pump controller comprises:
a data storage table configured to store a pump characteristic curve of the water pump(s) and a pump characteristic curve of the heating medium pump(s),
a calculator configured to calculate a volumetric flow rate of the water based on a rotational speed of the water pump(s) and the pump characteristic curve of the water pump(s), and
the calculator configured to calculate a volumetric flow rate of the heating medium based on a rotational speed of the heating medium pump(s) and the pump characteristic curve of the heating medium pump(s), and wherein the pump controller is configured to control the rotational speed of the heating medium pump(s) and the water pump(s) to maintain the calculated volumetric flow rate of the heating medium pumped to the water heating heat exchanger by the heating medium pump(s) higher than or equal to the calculated volumetric flow rate of the water pumped to the water heating heat exchanger by the water pump(s).

2. The heat pump heating and hot-water system according to claim 1, wherein an inside diameter of the heating medium piping is larger than or equal to an inside diameter of the water piping.

3. The heat pump heating and hot-water system according to claim 1, wherein the heat pump comprises a refrigerant circuit in which a compressor, a condenser, an expansion valve, and an evaporator are connected by a refrigerant piping, wherein the system further comprises:

a temperature sensor configured to detect a high-pressure liquid refrigerant temperature which is a temperature of the refrigerant flowing out of the condenser; and a temperature sensor configured to detect a temperature of the heating medium flowing into the condenser, and wherein the heat pump controller is configured to:

determine a target value of the high-pressure liquid refrigerant temperature based on the temperature of the heating medium flowing into the condenser; and control the expansion valve and maintain the high-pressure liquid refrigerant temperature at the target value.

4. The heat pump heating and hot-water system according to claim 1, further comprising a temperature sensor configured to detect a temperature of the water flowing out of the water heating heat exchanger, wherein the pump controller is configured to control the water pump(s) and maintain the temperature of the water flowing out of the water heating heat exchanger at a preset temperature.

5. The heat pump heating and hot-water system according to claim 1, wherein the pump controller ensures that a frequency of changes in rotational speed of the heating medium pump(s) is lower than or equal to a frequency of changes in rotational speed of the water pump(s).

6. The heat pump heating and hot-water system according to claim 1, wherein the heat pump controller and the pump controller ensures that a frequency of changes in rotational speed of the heating medium pump(s) is lower than or equal to a frequency of changes in operating frequency of a compressor of the heat pump.

7. The heat pump heating and hot-water system according to claim 1, further comprising a second heating medium pump connected in parallel to the heating medium pump(s), wherein the second heating medium pump operates while the heating medium is pumped to the indoor heating heat exchanger and the second heating medium pump stands idle while the heating medium is pumped to the water heating heat exchanger.

8. A heat pump heating and hot-water system comprising:

a heat pump for heating a heating medium;

one or a plurality of heating medium pumps for pumping the heating medium;

a water heating heat exchanger for heating water by heat exchange between the heating medium and the water;

an indoor heating heat exchanger for warming a room by the heating medium;

a flow path switch configured to switch a destination of the heating medium between the water heating heat exchanger and the indoor heating heat exchanger;

a heating medium piping for connecting the heating medium pump(s), the water heating heat exchanger, the indoor heating heat exchanger, and the flow path switch;

a hot-water storage tank;

one or a plurality of water pumps for pumping the water;

a water piping for connecting the hot-water storage tank, the water pump(s), and the water heating heat exchanger, the water piping includes a piping circuit allowing the water taken out of the hot-water storage tank to go through the water heating heat exchanger and to return to the hot-water storage tank;

a heat pump controller for controlling the heat pump;

a pump controller for controlling the heating medium pump(s) and the water pump(s);

a temperature sensor configured to detect a temperature of the heating medium flowing into the water heating heat exchanger;

a temperature sensor configured to detect a temperature of the heating medium flowing out of the water heating heat exchanger;

a temperature sensor configured to detect a temperature of the water flowing into the water heating heat exchanger; and a temperature sensor configured to detect a temperature of the water flowing out of the water heating heat exchanger, wherein the pump controller is configured to control a rotational speed of the heating medium pump(s), while the water is heated by the heat exchange between the heating medium and the water in the water heating heat exchanger, and maintain a difference between the detected temperature of the heating medium flowing into the water heating heat exchanger and the detected temperature of the heating medium flowing out of the water heating heat exchanger is smaller than or equal to a difference between the detected temperature of the water flowing out of the water heating heat exchanger and the detected temperature of the water flowing into the water heating heat exchanger.

9. The heat pump heating and hot-water system according to claim 8, wherein an inside diameter of the heating medium piping is larger than or equal to an inside diameter of the water piping.

10. The heat pump heating and hot-water system according to claim 8, wherein the heat pump comprises a refrigerant circuit in which a compressor, a condenser, an expansion valve, and an evaporator are connected by a refrigerant piping, wherein the system further comprises:

a temperature sensor configured to detect a high-pressure liquid refrigerant temperature, which is a temperature of the refrigerant flowing out of the condenser; and a temperature sensor configured to detect a temperature of the heating medium flowing into the condenser, and wherein the heat pump controller is configured to:

determine a target value of the high-pressure liquid refrigerant temperature based on the temperature of the heating medium flowing into the condenser; and control the expansion valve and maintain the high-pressure liquid refrigerant temperature at the target value.

11. The heat pump heating and hot-water system according to claim 8, further comprising a temperature sensor configured to detect a temperature of the water flowing out of the water heating heat exchanger, wherein the pump controller is configured to control the water pump(s) and maintain the temperature of the water flowing out of the water heating heat exchanger at a preset temperature.

12. The heat pump heating and hot-water system according to claim 8, wherein the pump controller ensures that a frequency of changes in rotational speed of the heating medium pump(s) is lower than or equal to a frequency of changes in rotational speed of the water pump(s).

13. The heat pump heating and hot-water system according to claim 8, wherein the heat pump controller and the pump controller ensures that a frequency of changes in rotational speed of the heating medium pump(s) is lower than or equal to a frequency of changes in operating frequency of a compressor of the heat pump.

14. The heat pump heating and hot-water system according to claim 8, further comprising a second heating medium pump connected in parallel to the heating medium pump(s), wherein the second heating medium pump operates while the heating medium is pumped to the indoor heating heat exchanger and the second heating medium pump stands idle while the heating medium is pumped to the water heating heat exchanger.

15. A heat pump heating and hot-water system comprising:

a heat pump for heating a heating medium;

one or a plurality of heating medium pumps for pumping the heating medium;

a water heating heat exchanger for heating water by heat exchange between the heating medium and the water;

an indoor heating heat exchanger for warming a room by the heating medium;

a flow path switch configured to switch a destination of the heating medium between the water heating heat exchanger and the indoor heating heat exchanger;

a heating medium piping for connecting the heating medium pump(s), the water heating heat exchanger, the indoor heating heat exchanger, and the flow path switch;

a hot-water storage tank;

one or a plurality of water pumps for pumping the water;

a water piping for connecting the hot-water storage tank, the water pump(s), and the water heating heat exchanger, the water piping includes a piping circuit allowing the water taken out of the hot-water storage tank to go through the water heating heat exchanger and to return to the hot-water storage tank;

a heat pump controller for controlling the heat pump;

a pump controller for controlling the heating medium pump(s) and the water pump(s), a temperature sensor configured to detect a temperature of the heating medium flowing into the water heating heat exchanger; and a temperature sensor configured to detect a temperature of the heating medium flowing out of the water heating heat exchanger, the pump controller comprising:

a data storage table configured to store a pump characteristic curve of the water pump(s);

a calculator configured to calculate a volumetric flow rate of the heating medium based on the detected temperature of the heating medium flowing into the water heating heat exchanger, the detected temperature of the heating medium flowing out of the water heating heat exchanger, and a heating power of the heat pump; and the calculator configured to calculate a volumetric flow rate of the water based on the pump characteristic curve of the water pump(s) and a rotational speed of the water pump(s), the pump controller being configured to control a rotational speed of the heating medium pump(s) and maintain the calculated volumetric flow rate of the heating medium pumped to the water heating heat exchanger by the heating medium pump(s) higher than or equal to the calculated volumetric flow rate of the water pumped to the water heating heat exchanger by the water pump(s).

16. The heat pump heating and hot-water system according to claim 15, wherein an inside diameter of the heating medium piping is larger than or equal to an inside diameter of the water piping.

17. The heat pump heating and hot-water system according to claim 15, wherein the heat pump comprises a refrigerant circuit in which a compressor, a condenser, an expansion valve, and an evaporator are connected by a refrigerant piping, wherein the system further comprises:

a temperature sensor configured to detect a high-pressure liquid refrigerant temperature, which is a temperature of the refrigerant flowing out of the condenser; and a temperature sensor configured to detect a temperature of the heating medium flowing into the condenser, and wherein the heat pump controller is configured to:

determine a target value of the high-pressure liquid refrigerant temperature based on the temperature of the heating medium flowing into the condenser; and control the expansion valve to maintain the high-pressure liquid refrigerant temperature at the target value.

18. The heat pump heating and hot-water system according to claim 15, further comprising a temperature sensor configured to detect a temperature of the water flowing out of the water heating heat exchanger, wherein the pump controller is configured to control the water pump(s) and maintain the temperature of the water flowing out of the water heating heat exchanger at a preset temperature.

19. The heat pump heating and hot-water system according to claim 15, wherein the pump controller ensures that a frequency of changes in rotational speed of the heating medium pump(s) is lower than or equal to a frequency of changes in rotational speed of the water pump(s).

20. The heat pump heating and hot-water system according to claim 15, wherein the heat pump controller and the pump controller ensures that a frequency of changes in rotational speed of the heating medium pump(s) is lower than or equal to a frequency of changes in operating frequency of a compressor of the heat pump.

21. The heat pump heating and hot-water system according to claim 15, further comprising a second heating medium pump connected in parallel to the heating medium pump(s), wherein the second heating medium pump operates while the heating medium is pumped to the indoor heating heat exchanger and the second heating medium pump stands idle while the heating medium is pumped to the water heating heat exchanger.

* * * * *